United States Patent
Seo et al.

(10) Patent No.: US 12,422,645 B2
(45) Date of Patent: Sep. 23, 2025

(54) LENS ASSEMBLY AND ELECTRONIC DEVICE INCLUDING SAME

(71) Applicant: Samsung Electronics Co., Ltd., Gyeonggi-do (KR)

(72) Inventors: Jungpa Seo, Gyeonggi-do (KR); Kihuk Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 613 days.

(21) Appl. No.: 17/852,855

(22) Filed: Jun. 29, 2022

(65) Prior Publication Data

US 2023/0068298 A1    Mar. 2, 2023

Related U.S. Application Data

(63) Continuation of application No. PCT/KR2022/005778, filed on Apr. 22, 2022.

(30) Foreign Application Priority Data

Aug. 11, 2021 (KR) .................. 10-2021-0105954

(51) Int. Cl.
*G02B 9/64* (2006.01)
*G02B 13/16* (2006.01)
*G02B 3/00* (2006.01)

(52) U.S. Cl.
CPC ............... *G02B 9/64* (2013.01); *G02B 13/16* (2013.01); *G02B 2003/0093* (2013.01)

(58) Field of Classification Search
CPC ... G02B 9/64; G02B 13/16; G02B 2003/0093
(Continued)

(56) References Cited

U.S. PATENT DOCUMENTS 8,908,268 B2 * 12/2014 Lee .................... G02B 9/10
359/356
12,032,127 B2   7/2024 Sun
(Continued)

FOREIGN PATENT DOCUMENTS

CN     111025602 A      4/2020
CN     111766685 A  * 10/2020   ......... G02B 13/0045
(Continued)

OTHER PUBLICATIONS

International Search Report dated Aug. 2, 2022.
European Search Report dated Aug. 30, 2024.
Modern Lens Design XP55152035.

*Primary Examiner* — Stephone B Allen
*Assistant Examiner* — Boutsikaris Leonidas
(74) *Attorney, Agent, or Firm* — Cha & Reiter, LLC

(57) ABSTRACT

According to certain embodiments disclosed herein, a lens assembly and/or an electronic device including the same may include an image sensor, and first to ninth lenses sequentially arranged along an optical axis. The first lens may include a convex object side surface while having positive refractive power, the second lens may include a concave image sensor side surface while having negative refractive power, the third lens may have positive refractive power, and the eighth lens may have has negative refractive power and may include an object side surface and an image sensor side surface, at least one of which is an aspherical surface including at least one inflection point. The lens assembly and/or the electronic device may satisfy Conditional Expression 1: $20 \leq v3 \leq 40$ and Conditional Expression 2: $1.7 \leq Fno \leq 2.0$. Here, "v3" may be an Abbe number of the third lens, and "Fno" may be an F-number of the lens assembly. Various other embodiments are possible.

11 Claims, 12 Drawing Sheets

(58) Field of Classification Search
USPC .......................................................... 359/257
See application file for complete search history.

(56) References Cited

U.S. PATENT DOCUMENTS

| | | | |
|---|---|---|---|
| 12,061,320 B2 | 8/2024 | Meng | |
| 2008/0297914 A1 | 12/2008 | Enomoto | |
| 2010/0118416 A1 | 5/2010 | Do | |
| 2016/0363743 A1 | 12/2016 | Yoo | |
| 2017/0307858 A1 | 10/2017 | Chen | |
| 2019/0250382 A1* | 8/2019 | Lee | H04N 23/698 |
| 2019/0258028 A1* | 8/2019 | Huang | H04N 23/55 |
| 2020/0066163 A1 | 2/2020 | Emsbach et al. | |
| 2020/0209593 A1 | 7/2020 | Hirano | |
| 2020/0241243 A1 | 7/2020 | Hirano | |
| 2020/0393652 A1 | 12/2020 | Kuo | |
| 2020/0393653 A1 | 12/2020 | Chen | |
| 2020/0400922 A1 | 12/2020 | Hirano | |
| 2021/0396955 A1 | 12/2021 | Okano et al. | |
| 2022/0066163 A1* | 3/2022 | Yu | G02B 13/06 |
| 2022/0075144 A1 | 3/2022 | Shang | |
| 2022/0075147 A1 | 3/2022 | Zhu | |
| 2022/0196985 A1* | 6/2022 | Ye | G02B 13/0045 |
| 2022/0317418 A1* | 10/2022 | Cheng | G02B 27/0018 |

FOREIGN PATENT DOCUMENTS

| | | |
|---|---|---|
| CN | 111766688 A | 10/2020 |
| CN | 111812810 A | 10/2020 |
| CN | 111812813 A | 10/2020 |
| CN | 111812816 A | 10/2020 |
| JP | 2006-30581 A | 2/2006 |
| JP | 2008-287007 A | 11/2008 |
| JP | 2020-64173 A | 4/2020 |
| JP | 2020-109436 A | 7/2020 |
| JP | 2020-118922 A | 8/2020 |
| KR | 10-2008-0106076 A | 12/2008 |
| KR | 10-2016-0144847 A | 12/2016 |

* cited by examiner

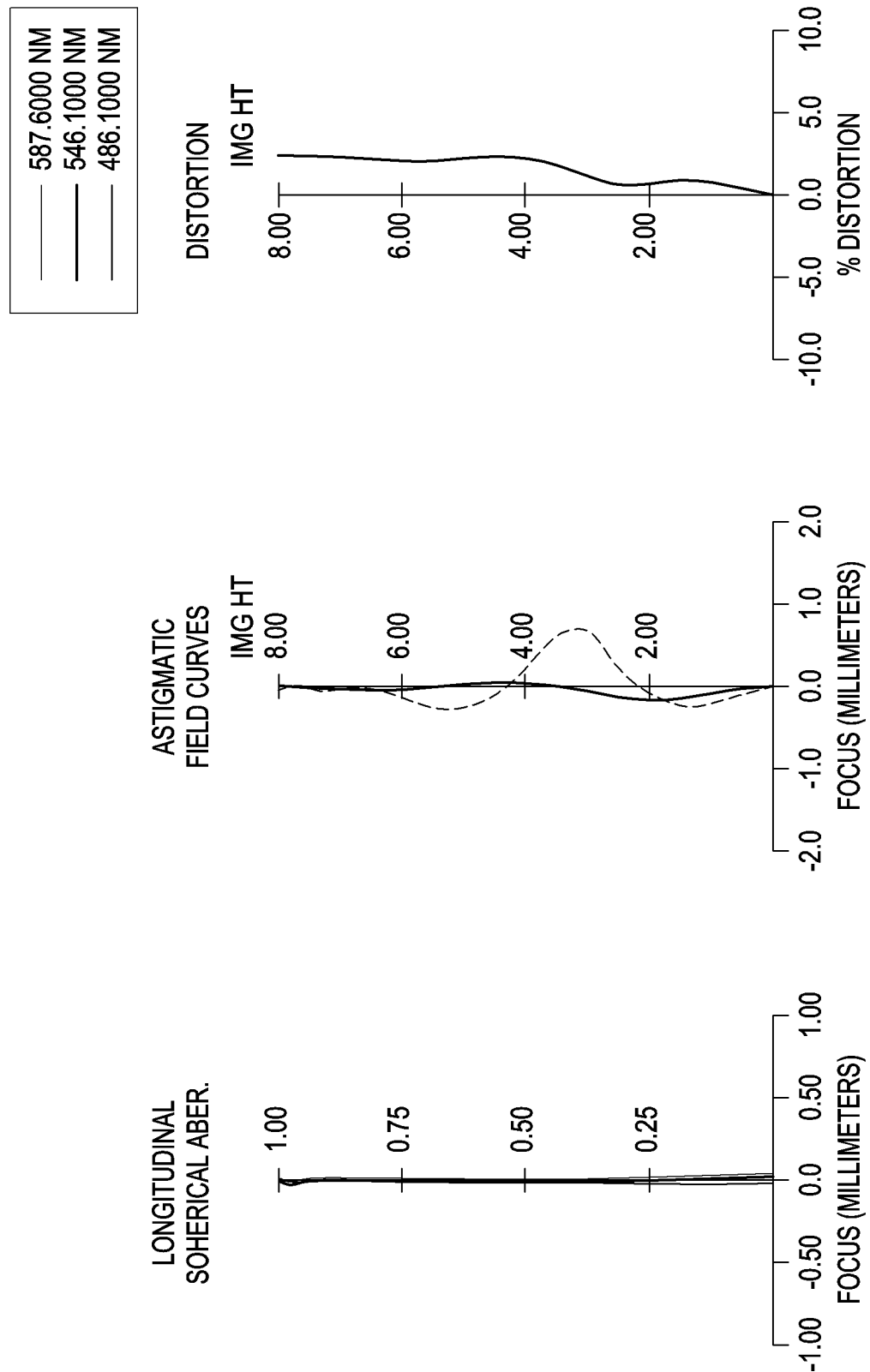

LENS ASSEMBLY AND ELECTRONIC DEVICE INCLUDING SAME

CROSS-REFERENCE TO RELATED APPLICATION(S)

This application is a continuation of International Application No. PCT/KR2022/005778, which was filed on Apr. 22, 2022, and claims priority to Korean Patent Application No. 10-2021-0105954, filed on Aug. 11, 2021, in the Korean Intellectual Property Office, the disclosure of which are incorporated by reference herein their entirety.

BACKGROUND

Technical Field

One or more embodiments disclosed herein generally relate to a lens assembly. For example, certain embodiments relate to a lens assembly including a plurality of lenses and an electronic device including the lens assembly.

Description of Related Art

Optical devices (e.g., a camera capable of capturing images or videos) have come to be widely used. Recently, digital cameras or video cameras having a solid image sensor (e.g., a charge-coupled device (CCD) or a complementary metal-oxide semiconductor (CMOS)), have been widely distributed. Lens assemblies working with solid-state image sensors (CCD or CMOS) are replacing film-type optical devices due to easier image storage and reproduction as well as being more portable.

Recently, a plurality of optical devices, for example, two or more lens assemblies such as for macro camera, telephoto camera, and/or wide-angle camera, have been mounted in a single electronic device, thereby improving the quality of captured images. Furthermore, it has become possible to provide various visual effects to the captured images. For example, images of an object may be acquired via a plurality of cameras having different optical characteristics, and the images may be synthesized so as to acquire a high-quality captured image. As a plurality of optical devices (e.g., cameras) are mounted to acquire high-quality captured images, electronic devices such as mobile communication terminals and smartphones are gradually replacing electronic devices specialized for photographing functions, such as digital compact cameras. Further, it is expected that the electronic devices such as mobile communication terminals and smartphones can replace high-performance cameras such as single-lens reflex digital cameras.

The above-described information may be provided as background for the purpose of helping understanding of the disclosure of this document. No claim or determination is made as to whether any of the foregoing may be applied as prior art regarding the disclosure of this document.

SUMMARY

In a high-performance camera such as a single-lens reflex digital camera, a large-sized image sensor of approximately 1/1.33" to 1" may be used, and the performance of the camera can be used to improve the quality of captured images, which may be proportional to the size of the image sensor. As the image sensor increases, the number or size of lens(es) equipped in the lens assembly or the electronic device may also increase. Nine or more lenses may be required to provide aberration control performance or modulation transfer function (MTF) performance suitable for such a large-sized (e.g., approximately 1/1.33" to 1" size) image sensor. However, when the number of lenses is increased, such lens assemblies may not be suitable for portable electronic devices.

According to an embodiment disclosed herein, a lens assembly and/or an electronic device including the same may include an image sensor, and a first lens, a second lens, a third lens, a fourth lens, a fifth lens, a sixth lens, a seventh lens, an eighth lens, and a ninth lens that are sequentially arranged along an optical axis from an object side toward the image sensor. The first lens may include a convex object side surface while having positive refractive power, the second lens may include a concave image sensor side surface while having negative refractive power, the third lens may have positive refractive power, and the eighth lens may have negative refractive power and may include an object side surface and an image sensor side surface, at least one of which is an aspherical surface including at least one inflection point. The lens assembly and/or the electronic device may satisfy Conditional Expression 1 and Conditional Expression 2 below.

$$20 \leq v3 \leq 40 \qquad \text{[Conditional Expression 1]}$$

$$1.7 \leq Fno \leq 2.0 \qquad \text{[Conditional Expression 2]}$$

Here, "v3" may be an Abbe number of the third lens, and "Fno" may be an F-number of the lens assembly.

According to an embodiment disclosed herein, a lens assembly and/or an electronic device including the same may include an image sensor, and a first lens, a second lens, a third lens, a fourth lens, a fifth lens, a sixth lens, a seventh lens, an eighth lens, and a ninth lens sequentially arranged along the optical axis from the object side to the image sensor side. The first lens may include a convex object side surface while having positive refractive power, the second lens may have positive refractive power, the third lens may include a concave image sensor side surface while having negative refractive power, and the eighth lens may have negative refractive power and may include an object side surface and an image sensor side surface, at least one of which is an aspherical surface including at least one inflection point. The lens assembly and/or the electronic device including the same may satisfy Conditional Expressions 10 and Conditional Expressions 11 below.

$$20 \leq v3 \leq 40 \qquad \text{[Conditional Expression 10]}$$

$$1.6 \leq N3 \leq 2.0 \qquad \text{[Conditional Expression 11]}$$

Here, "v3" may be an Abbe number of the third lens, and "N3" may be a refractive index of the third lens.

According to an embodiment disclosed herein, an electronic device may include at least one camera including a lens assembly, and a processor or an image signal processor configured to acquire image information based on light incident on the at least one camera. The lens assembly may include an image sensor, and a first lens, a second lens, a third lens, a fourth lens, a fifth lens, a sixth lens, a seventh lens, an eighth lens, and a ninth lens sequentially arranged along an optical axis from an object side to the image sensor side. The first lens may have a positive refractive power and may have a convex object side surface, the second lens may include a concave image sensor side surface while having a negative refractive power, the third lens may have a positive refractive power, and the eighth lens may have negative refractive power and may include an object side surface and an image sensor side surface, at least one of which is an aspherical surface including one inflection point. The electronic device may satisfy Conditional Expression 19 and Conditional Expression 20 below.

$20 \leq v3 \leq 40$         [Conditional Expression 19]

$1.7 \leq Fno \leq 2.0$         [Conditional Expression 20]

Here, "v3" may be an Abbe number of the third lens, and "Fno" may be an F-number of the lens assembly.

Additional aspects will be set forth in part in the description which follows and, in part, will be apparent from the description, or may be learned by practice of the presented embodiments.

BRIEF DESCRIPTION OF THE DRAWINGS

The above-described aspects or other aspects, configurations, and/or advantages regarding various embodiments disclosed herein may become more apparent through the following detailed description made with reference to the accompanying drawings.

FIGS. 12A to 12C are graphs illustrating respectively the spherical aberration, the astigmatism, and the distortion rate of the lens assembly according to still yet another one of various embodiments disclosed herein.

Throughout the appended drawings, like reference numerals may be assigned to like parts, components, and/or structures.

DETAILED DESCRIPTION

Figure 1:
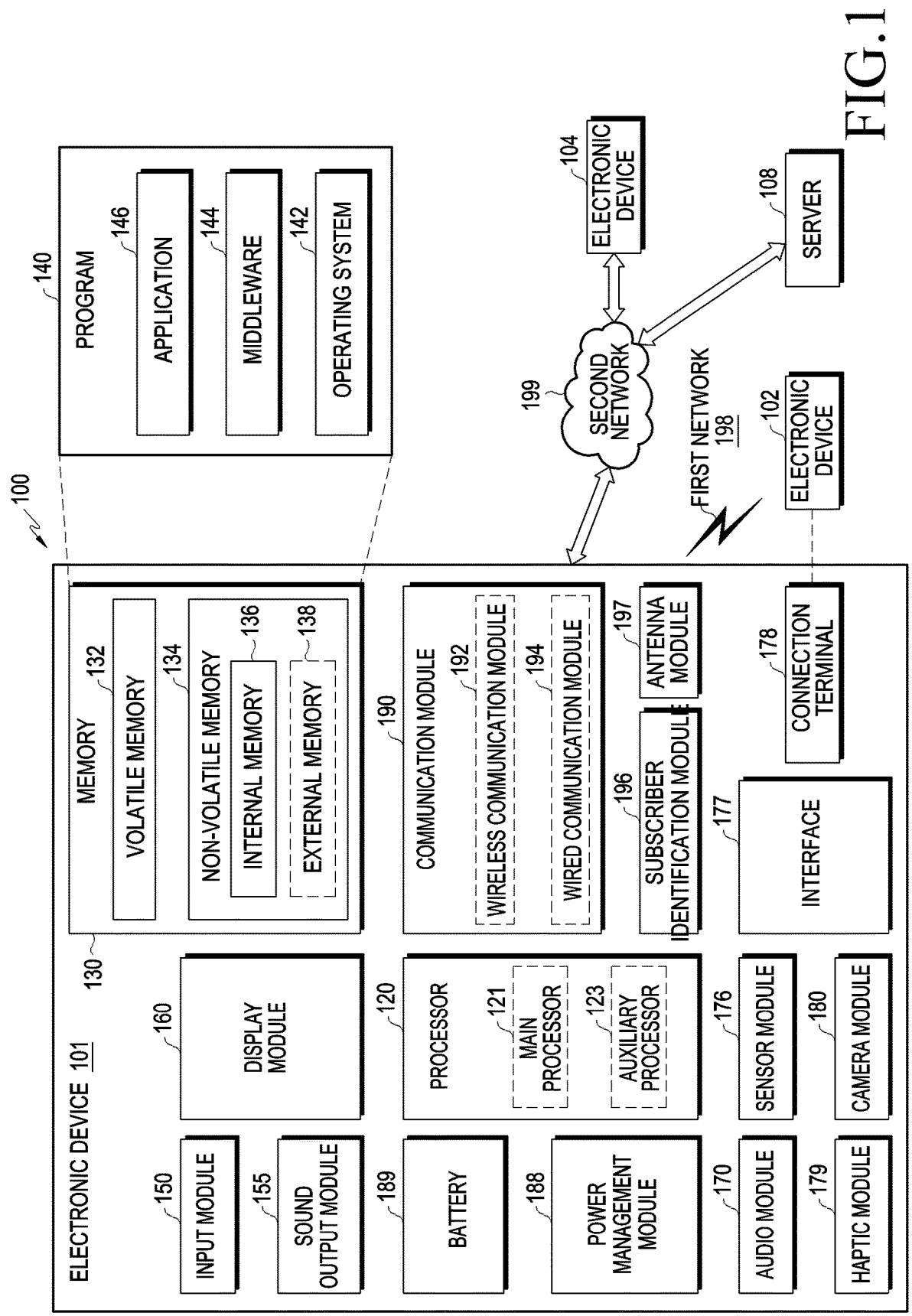
FIG. 1 is a block diagram of an electronic device according to an embodiment in a network environment.

Certain embodiments disclosed herein are able to provide a lens assembly that is capable of providing performance suitable for a large-sized image sensor, at least solving the above-described problems and/or disadvantages, and providing the advantages to be described below, and/or an electronic device including the lens assembly.

Certain embodiments disclosed herein are able to provide a lens assembly that is miniaturized while providing good aberration control performance or MTF performance by including a plurality of (e.g., 9 or more) lenses, and/or an electronic device (e.g., a smart phone) including the same.

According to certain embodiments disclosed herein, since the lens assembly (and/or the electronic device including the same) includes nine lenses, and the third lens has an Abbe number in a predetermined range, it is possible to prevent chromatic aberration from increasing. In addition, since the F-number, that is, the focal length compared to the size of the incident pupil, is controlled within a predetermined range, it is possible to prevent image quality from being deteriorated due to aberration. For example, miniaturization may be facilitated while implementing the optical system of a large-sized image sensor ranging from approximately 1/1.33" to 1". In some embodiments, since the F-number is controlled to be within the predetermined range, it is possible for the lens assembly and/or the electronic device to acquire images of high quality even in a dark environment. In addition, since one of the second lens or the third lenses among the lenses has negative refractive power and a refractive index in a predetermined range, the lenses may be made easier for mass production while suppressing an increase in astigmatism. In addition, various other aspects of the invention recognized directly or indirectly through this document may be provided.

The following description made with reference to the appended drawings may be provided in order to help comprehensive understanding of the various implementations of the disclosure defined by the claims and their equivalents. A specific embodiment disclosed in the following description includes various specific details to help understanding, but is considered to be one of certain embodiments. Accordingly, it will be apparent to those skilled in the art that various changes and modifications of the various implementations described herein can be made without departing from the scope and spirit of the disclosure. In addition, descriptions of well-known functions and configurations may be omitted for clarity and brevity.

The terms and words used in the following description and claims are not limited to a bibliographical meaning, but may be used to clearly and consistently describe the certain embodiments disclosed herein. Therefore, it will be obvious to those skilled in the art that the following description of various implementations of the disclosure is provided only for the purpose of explanation, not for the purpose of limiting the disclosure defined as the scope of rights and equivalents thereto.

It should be understood that a singular form of "a", "an", and "the" contain plural meanings, unless the context clearly indicates otherwise. Thus, for example, "a component surface" may mean including one or more component surfaces.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108.

For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
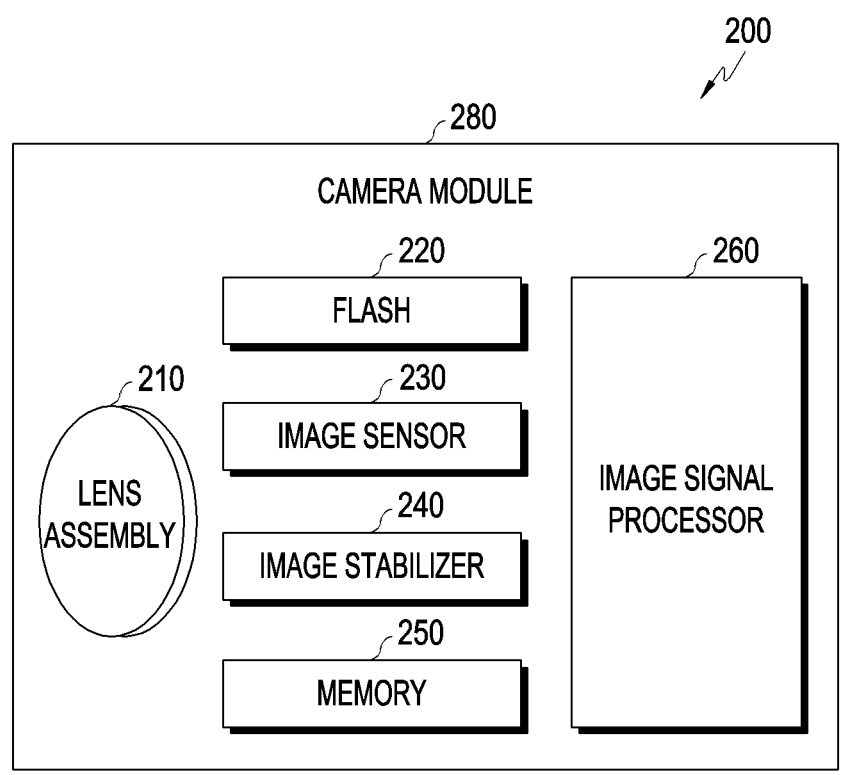
FIG. 2 is a block diagram of a camera module according to an embodiment.

FIG. 2 is a block diagram 200 illustrating the camera module 280 (e.g., the camera module 180 of FIG. 1) according to an embodiment. Referring to FIG. 2, the camera module 280 may include a lens assembly 210, a flash 220, an image sensor 230, an image stabilizer 240, memory 250 (e.g., buffer memory), or an image signal processor 260. In some embodiments, the lens assembly 210 may include an image sensor 230. The lens assembly 210 may collect light emitted or reflected from an object whose image is to be taken. The lens assembly 210 may include one or more lenses. According to an embodiment, the camera module 280 may include a plurality of lens assemblies 210. In such a case, the camera module 280 may form, for example, a dual camera, a 360-degree camera, or a spherical camera. Some of the plurality of lens assemblies 210 may have the same lens attribute (e.g., view angle, focal length, auto-focusing, F number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 280 or the electronic device 201 including the camera module 280. This allows compensating for at least part of a negative effect (e.g., image blurring) by the movement on an image being captured. The image stabilizer 240 may sense such a movement by the camera module 280 or the electronic device (e.g., the electronic device 101 of FIG. 1) using a gyro sensor (not shown) or an acceleration sensor (not shown) disposed inside or outside the camera module 280. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160 of FIG. 1. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory (e.g., the memory 130 of FIG. 1) or as a separate memory that is operated independently from the memory 250.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 280. An image processed by the image signal processor 260 may be stored back in the memory 250 for further processing, or may be provided to an external component (e.g., the memory 130, the display module 160, the electronic device 102, the electronic device 104, or the server 108 of FIG. 1) outside the camera module 280. According to an embodiment, the image signal processor 260 may be configured as at least part of the processor (e.g., the processor 120 of FIG. 1), or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device (e.g., the electronic device 101 of FIG. 1) may include a plurality of camera modules 280 having different attributes or functions. In such a case, at least one of the plurality of camera modules 280 may form, for example, a wide-angle camera and at least another of the plurality of camera modules 280 may form a telephoto camera. Similarly, at least one of the plurality of camera modules 280 may form, for example, a front camera and at least another of the plurality of camera modules 280 may form a rear camera.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 3:
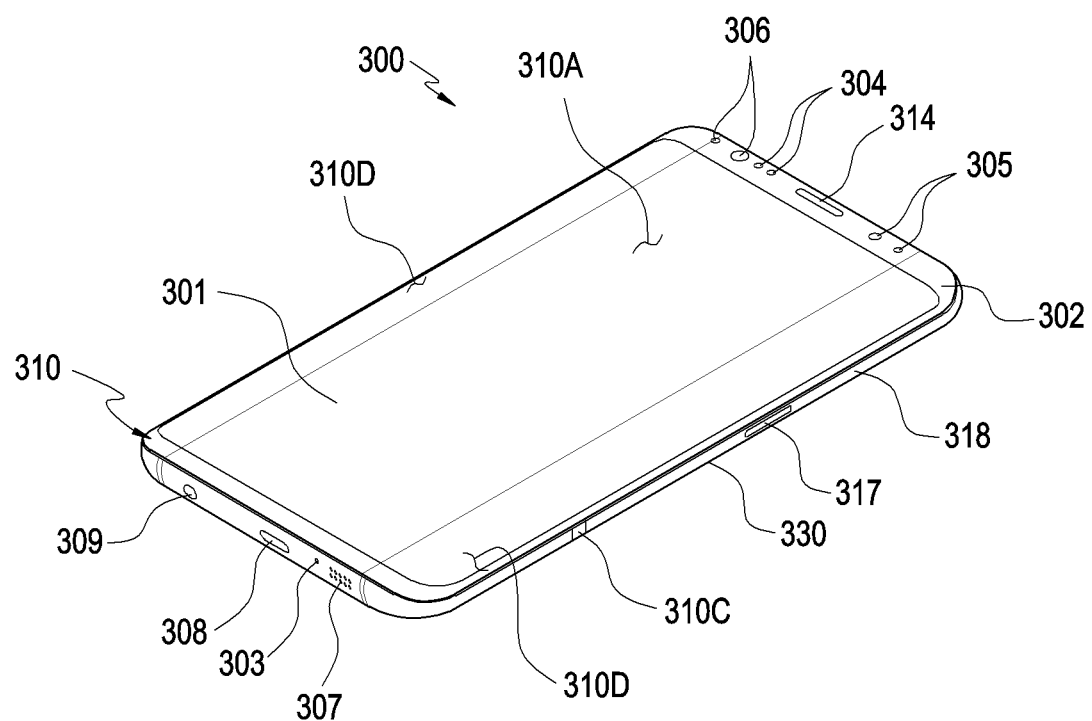
FIG. 3 is a perspective view illustrating the front side of an electronic device according to an embodiment.
Figure 4:
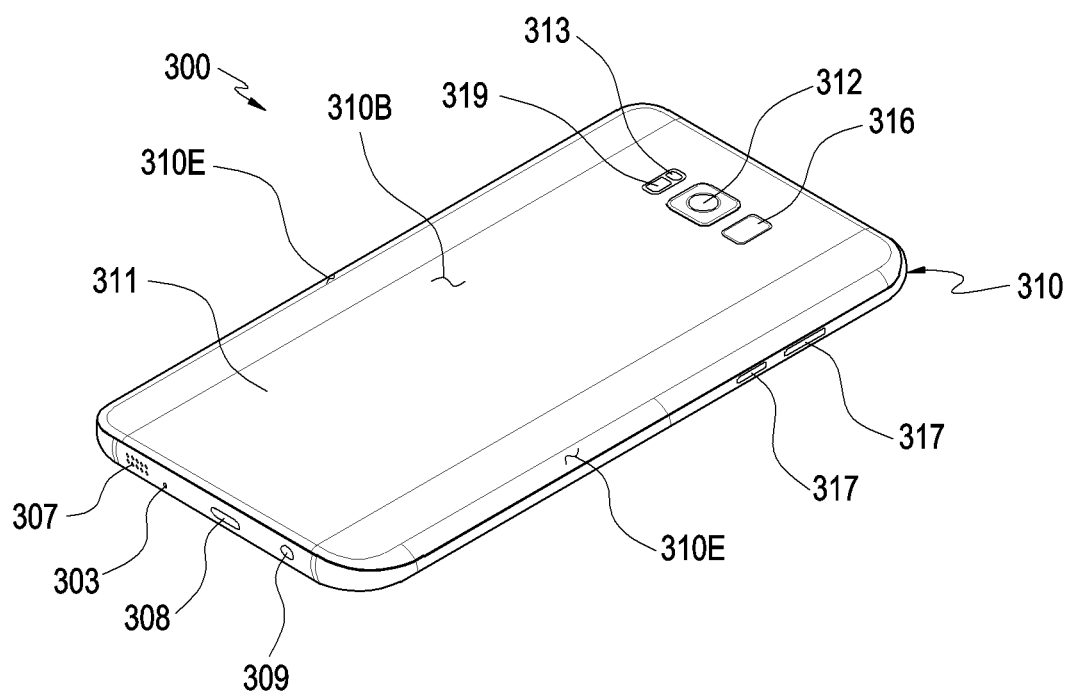
FIG. 4 is a perspective view illustrating the rear side of the electronic device illustrated in FIG. 3.

FIG. 3 is a perspective view illustrating the front side of an electronic device 300 (e.g., the electronic device 101 in FIG. 1) according to an embodiment. FIG. 4 is a perspective view illustrating the rear side of the electronic device 300 illustrated in FIG. 3.

Referring to FIGS. 3 and 4, the electronic device 300 (e.g., the electronic device 101 in FIG. 1) according to an embodiment may include a housing 310 including a first surface (or a front surface) 310A, a second surface (or a rear surface) 310B, and a side surface 310C surrounding a space between the first surface 310A and the second surface 310B. In another embodiment (not illustrated), the term "housing 310" may refer to a structure that includes at least parts of the first surface 310A, the second surface 310B, and the side surface 310C of FIG. 3. According to an embodiment, at least a portion of the first surface 310A may be defined by a substantially transparent front plate 302 (e.g., a glass plate or a polymer plate including various coating layers). In another embodiment, the front plate 302 may be coupled to the housing 310 so as to define an inner space with the housing 310. In certain embodiments, the term "inner space" may refer to the inner space of the housing 310 that accommodates at least a portion of a display 301 to be described later or the display device 160 in FIG. 1.

According to an embodiment, the second surface 310B may be defined by a substantially opaque rear plate 311. The rear plate 311 may be made of, for example, coated or colored glass, ceramic, polymer, metal (e.g., aluminum, stainless steel (STS), or magnesium), or a combination of two or more of these materials. The side surface 310C may be implemented by a side bezel structure (or a "side member") 318 coupled to the front plate 302 and the rear plate 311 and including a metal and/or a polymer. In another embodiments, the rear plate 311 and the side bezel structure 318 may be integrated together, and may be implemented with the same material (e.g., metal material such as aluminum).

In the illustrated embodiment, the front plate 302 may include, at the two opposite longitudinal edges thereof, two first areas 310D, which are bent from the first surface 310A toward the rear plate 311 and extend seamlessly. In the illustrated embodiment (see FIG. 4), the rear plate 311 may include, at the two opposite longitudinal edges thereof, two second areas 310E, which are bent from the second surface 310B toward the front plate 302 and extend seamlessly. In certain embodiments, the front plate 302 (or the rear plate 311) may include only one of the first areas 310D (or the second areas 310E). In another embodiment, some of the first areas 310D or the second areas 310E may not be included. In the above-described embodiments, when viewed from a side of the electronic device 300, the side bezel structure 318 may have a first thickness (or width) on the side surface in which the first areas 310D or the second areas 310E are not included (e.g., the side surface in which the connector hole 308 is disposed), and may have a second thickness, which is smaller than the first thickness, on the side surface in which the first areas 310D or the second areas 310E are included (e.g., the side surfaces in which the key input devices 317 are disposed).

According to an embodiment, the electronic device 300 may include at least one of the display 301, audio modules 303, 307, and 314, sensor modules 304, 316, and 319, camera modules 305, 312, and 313 (e.g., the camera modules 180 and 280 in FIG. 1 or 2), key input devices 317, light-emitting elements 306, and connector holes 308 and 309. In other embodiments, at least one of the components (e.g., the key input devices 317 or the light-emitting elements 306) may be omitted from the electronic device 300, or the electronic device 101 may additionally include other components.

The display 301 (e.g., the display device 160 in FIG. 1) may be exposed through a substantial portion of, for example, the front plate 302. In an embodiment, at least a portion of the display 301 may be exposed through the front plate 302 defining the first surface 310A and the first areas 310D of the side surfaces 310C. In an embodiment, the edges of the display 301 may be formed to be substantially the same as the shape of the periphery of the front plate 302 adjacent thereto. In another embodiment (not illustrated), the distance between the periphery of the display 301 and the periphery of the front plate 302 may be substantially constant in order to maximize the exposed area of the display 301.

In another embodiment (not illustrated), recesses or openings may be formed in a portion of a screen display area (e.g., an active area) of the display 301 or an area out of the screen display area (e.g., an inactive area), and at least one of audio modules 314 (e.g., the audio module 170 in FIG. 1), sensor modules 304 (e.g., the sensor module 176 in FIG. 1), camera modules 305, and light-emitting elements 306 may be aligned with the recesses or the openings. In another embodiment (not illustrated), the rear surface of the screen display area of the display 301 may include at least one of audio modules 314, sensor modules 304, camera modules 305, a fingerprint sensor 316, and light-emitting elements 306. In another embodiment (not illustrated), the display 301 may be coupled to or disposed adjacent to a touch-sensitive circuit, a pressure sensor capable of measuring a touch intensity (pressure), and/or a digitizer configured to detect a magnetic field-type stylus pen. In some embodiments, at least some of the sensor modules 304 and 319 and/or at least some of the key input devices 317 may be disposed in the first areas 310D and/or the second areas 310E.

The audio modules 303, 307, and 314 may include a microphone hole 303 and speaker holes 307 and 314. The microphone hole 303 may be aligned with a microphone disposed therein so as to acquire external sound, and in certain embodiments, multiple microphones may be disposed therein so as to detect the direction of the sound. The speaker holes 307 and 314 may include an external speaker hole 307 and a call receiver hole 314. In some embodiments, the speaker holes 307 and 314 and the microphone hole 303 may be implemented as a single hole, or a speaker (e.g., a piezo speaker) may be seated in the electronic device without the speaker holes 307 and 314.

The sensor modules 304, 316, and 319 may generate electrical signals or data values corresponding to the internal operating states or the external environmental states of the electronic device 300. The sensor modules 304, 316, and 319 may include, for example, a first sensor module 304 (e.g., proximity sensor), a second sensor module (not illustrated) (e.g., fingerprint sensor) disposed on the first surface 310A of the housing 310, a third sensor module 319 (e.g., heart rate monitor (HRM) sensor), and/or a fourth sensor module 316 (e.g., fingerprint sensor) disposed on the second surface 310B of the housing 310. The fingerprint sensor may be disposed not only on the first surface 310A (e.g., the display 301) of the housing 310, but also on the second surface 310B. The electronic device 300 may further include at least one of sensor modules (not illustrated), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 305, 312, and 313 may include a first camera device 305 disposed on the first surface 310A of the electronic device 300, and a second camera device 312 and/or a flash 313 disposed on the second surface 310B. The camera modules 305 and 312 may include one or more lenses, image sensor, and/or image signal processor. The flash 313 may be implemented as, for example, a light-emitting diode or a xenon lamp. In certain embodiments, two or more lenses (e.g., an infrared camera lens, a wide-angle lens, and a telephoto lens) and image sensors may be disposed on one surface of the electronic device 300.

The key input devices 317 may be disposed on the side surface 310C of the housing 310. In another embodiment, the electronic device 300 may not include some or all of the above-mentioned key input devices 317, and a key input device 317, which is not included therein, may be implemented in another form of a soft key or the like on the display 301. In some embodiments, the key input devices may include a sensor module 316 disposed on the second surface 310B of the housing 310.

The light-emitting elements 306 may be disposed, for example, on the first surface 310A of the housing 310. The light-emitting elements 306 may provide, for example, information about the state of the electronic device 300 as a light signal (e.g. a flashing LED). In another embodiment, the light-emitting elements 306 may also be a light source that is interlocked with, for example, the operation of the camera modules 305. The light-emitting elements 306 may be implemented as, for example, an LED, an IR LED, and a xenon lamp.

The connector holes 308 and 309 may include a first connector hole 308, which is capable of accommodating a connector (e.g., USB connector) for transmitting/receiving power and/or data to/from an external electronic device, and/or a second connector hole (e.g., earphone jack) 309, which is capable of accommodating a connector for transmitting/receiving an audio signal to/from an external electronic device.

Figure 5:
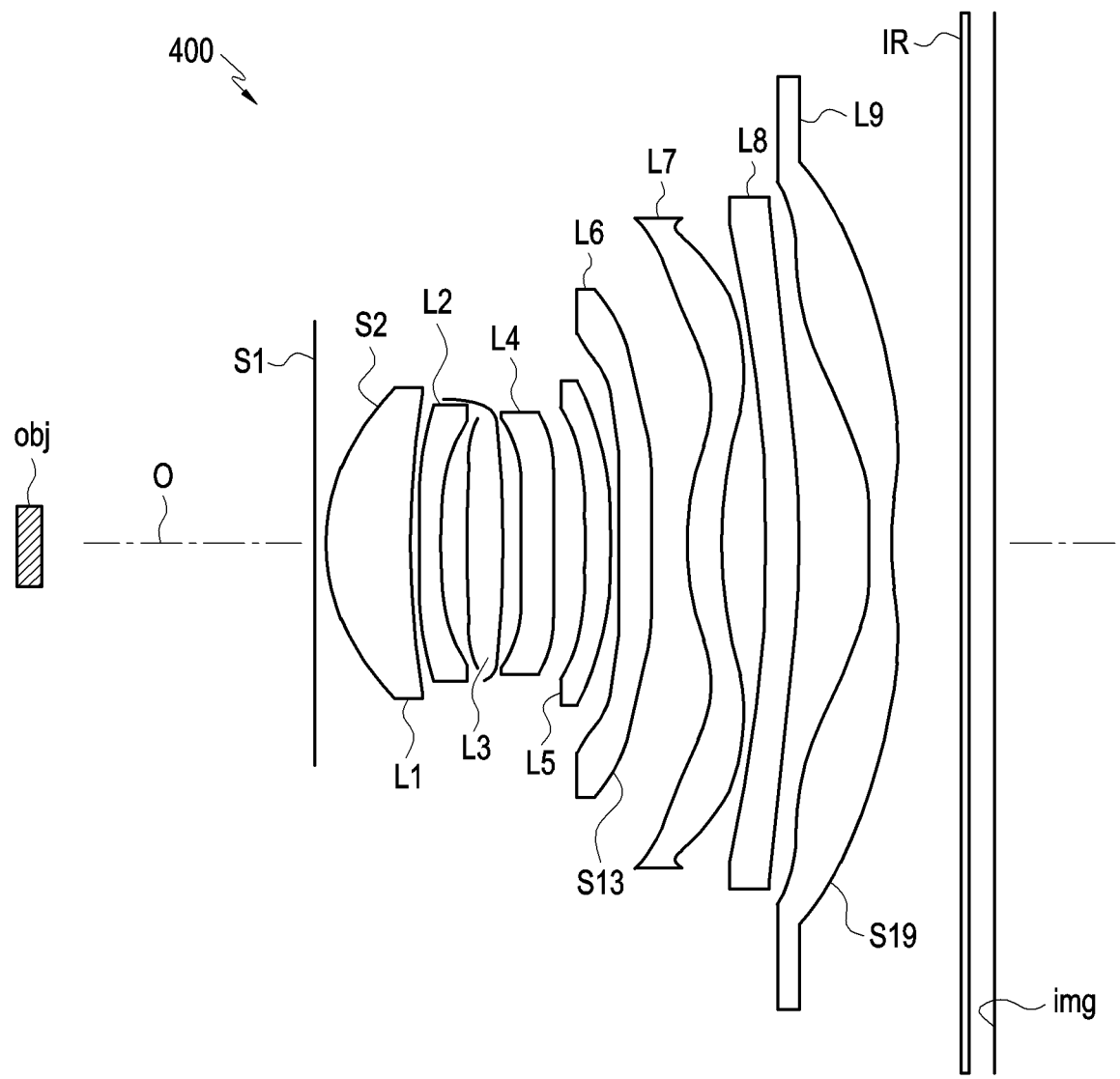
FIG. 5 is a configuration view illustrating a lens assembly according to one of various embodiments disclosed herein.
Figure 6:
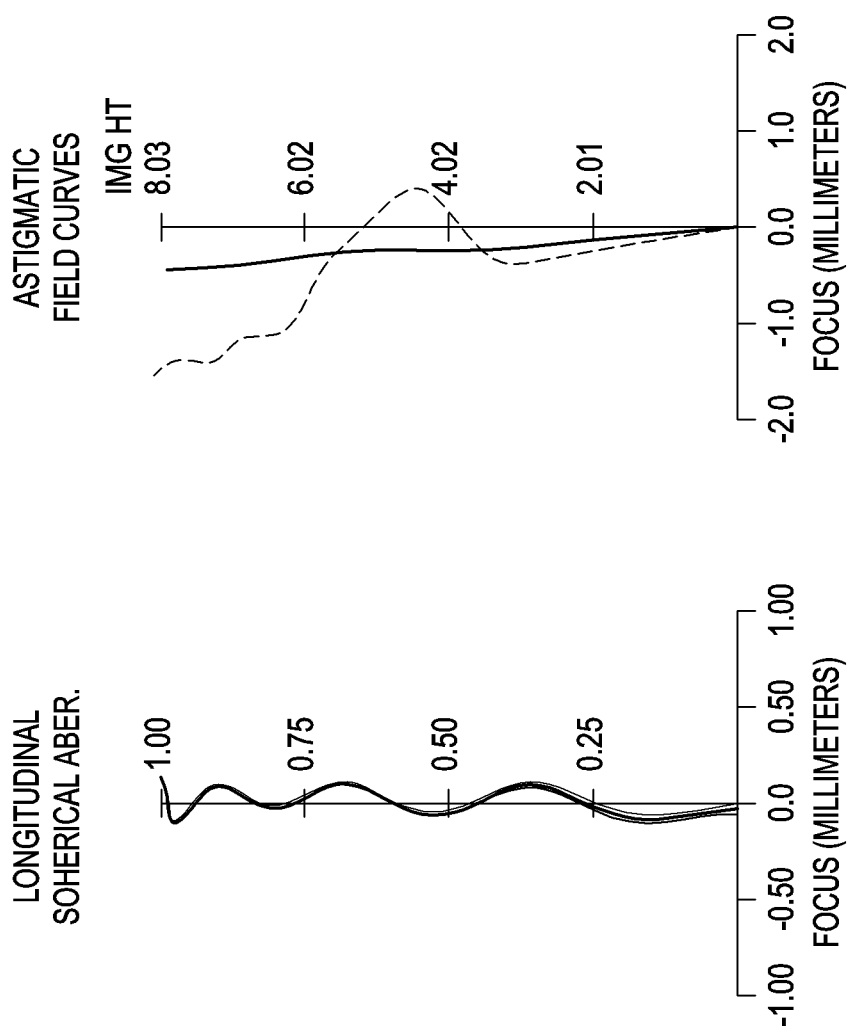
FIGS. 6A to 6C are graphs illustrating respectively the spherical aberration, the astigmatism, and the distortion rate of the lens assembly according to one of various embodiments disclosed herein.

FIG. 5 is a view illustrating the configuration of a lens assembly 400 according to one of various embodiments disclosed herein. FIGS. 6A to 6C are graphs illustrating respectively the spherical aberration, the astigmatism, and the distortion rate of the lens assembly (e.g., the lens assembly 400 in FIG. 5) according to one of various embodiments disclosed herein.

FIG. 6A is a graph illustrating the spherical aberration of the lens assembly 400 according to one of various embodiments disclosed herein, in which the horizontal axis represents longitudinal spherical aberration coefficient and the vertical axis represents normalized distance from the center of an optical axis. FIG. 6A illustrates the change in longitudinal spherical aberration depending on the wavelength of light. FIG. 6B is a graph illustrating the astigmatism of the lens assembly 400 according to one of various embodiments disclosed herein, and FIG. 6C is a graph illustrating the distortion rate of the lens assembly 400 according to one of various embodiments disclosed herein.

Referring to FIG. 5 and FIGS. 6A to 6C, the lens assembly 400 (e.g., the lens assembly 210 and/or the image sensor 230 of FIG. 2) according to one of various embodiments disclosed herein may include a plurality (e.g., at least 9) lenses L1, L2, L3, L4, L5, L6, L7, L8, and L9, an infrared filter (IR), and/or an image sensor (e.g., implementing an imaging surface img or the image sensor 230 in FIG. 2). According to an embodiment, the image sensor 230 may be described as a component separate from the lens assembly 400. For example, the image sensor 230 may be mounted in an electronic device (e.g., the electronic device 101, 102, 104, or 300 in FIG. 1 or FIG. 3) or an optical device (e.g., the camera module 180 or 280 in FIG. 1 or 2), and a plurality of lenses L1, L2, L3, and L4 constituting the lens assembly 400 may be separately mounted in the electronic device or the optical device while being aligned with the image sensor 230 on the optical axis O. In an embodiment, the lens assembly 400 may be disposed in any one of the camera modules 305, 312, and 313 in FIG. 3 or FIG. 4.

According to an embodiment, the plurality of lenses L1, L2, L3, L4, L5, L6, L7, L8, and L9 may be made of plastic material or glass material, and may include a first lens L1, a second lens L2, a third lens L3, a fourth lens L4, a fifth lens L5, a sixth lens L6, a seventh lens L7, an eighth lens L8, and/or a ninth lens L9 sequentially arranged in the direction from the object side to the image sensor 230 (e.g., the imaging surface). For example, the lenses L1, L2, L3, L4, L5, L6, L7, L8, and L9 may be aligned on the optical axis O together with the image sensor 230. Each of the lenses L1, L2, L3, L4, L5, L6, L7, L8, and L9 may include an object side surface and an image sensor side surface. It should be noted that, for the sake of clarity in the drawings, reference numerals in the drawings are omitted for some of the object side surface(s) and the image sensor side surfaces of the lenses L1, L2, L3, L4, L5, L6, L7, L8, and L9. In the following detailed description, although reference numerals are omitted from the drawings, the object side surface of a "$d_{th}$ lens," where "d" is a natural number "d," may be enumerated as the "$2d_{th}$ surface S2d", and the image sensor side surface of the "$d_{th}$ lens" may be enumerated as the "$(2d+1)_{th}$ surface S2d+1." For example, the object side surface of the eighth lens L8 may be defined as a "sixteenth surface S16", and the image sensor side surface of the eighth lens L8 may be defined as a "17th surface S17".

According to an embodiment, the first lens L1 may include a convex object side surface (e.g., the second surface S2) while having positive refractive power. Since the first lens L1 has positive refractive power, the lens assembly 400 may be reduced in size compared to where the first lens L1 has negative refractive power. In an embodiment, one of the second lens L2 and the third lens L3 may include a concave image sensor side surface while having negative refractive power, and the other one of the second lens L2 and the third lens L3 may have positive refractive power. In an embodiment to be described later, a lens including a concave image sensor side surface while having negative refractive power may generally be the second lens L2. However, the various embodiments disclosed herein are not limited thereto, and the third lens L3 may include a concave image sensor side while having negative refractive power, and in this case, the second lens L2 may have positive refractive power. In some embodiments, at least four of the lenses L1, L2, L3, L4, L5, L6, L7, L8, and L9 may be aspherical lenses. In another embodiment, the eighth lens L8 may include an object side surface and an image sensor side surface where each is an aspherical surface, while the eighth lens L8 has negative refractive power. In some embodiments, at least one of the object side surface and the image sensor side surface of the eighth lens L8 may be an aspherical surface including at least one inflection point.

According to an embodiment, the infrared filter IR may be disposed between the ninth lens L9 and the image sensor 230 (e.g., the imaging surface img), and may block light of a predetermined wavelength band, for example, infrared rays. For example, the infrared filter IR may block infrared rays while transmitting visible light, thereby blocking infrared rays from reaching the image sensor 230 or the imaging surface img. The wavelength band of light blocked by the infrared filter IR may be selected depending on specifications required for the lens assembly 400 or an electronic device (e.g., the electronic devices 101, 102, 104, and 300 in FIGS. 1 to 4) including the lens assembly 400. For example, when the lens assembly 400 in FIG. 5 is applied to an optical device for detecting infrared rays, it is possible to transmit infrared rays and to block light of another wavelength band (e.g., visible light) by replacing the infrared filter IR with a band pass filter.

According to an embodiment, the lens assembly 400 may be any one of the camera modules 180, 280, 305, 312, and 313 of FIGS. 1 to 4, and the processor 120 of FIG. 1 or the image signal processor of FIG. 2 may detect light incident from the outside using the lens assembly 400 and obtain image information based on the detected light. For example, the processor 120 or the image signal processor 260 may acquire an image of an object by using the camera or the lens assembly 400.

According to an embodiment, the lens assembly 400 may satisfy the conditions of Equation 1 below.

$$20 \leq v3 \leq 40 \qquad \text{[Equation 1]}$$

Here, "v3" may mean the Abbe number of the third lens L3. For example, in the lenses L1, L2, L3, L4, L5, L6, L7, L8, and L9, the third lens L3 may have an Abbe number of about 20 or more and about 40 or less, and by satisfying these conditions, the lens assembly 400 may suppress or prevent deterioration of image quality due to chromatic aberration while implementing a high-pixel optical system.

According to an embodiment, the lens assembly 400 may satisfy the conditions of Equation 2 below.

$$1.7 \leq \text{Fno} \leq 2.0 \qquad \text{[Equation 2]}$$

Here, "Fno" may be an F-number. The F-number is defined as the ratio between the focal length of the lens assembly 400 and the size of the incident pupil, and when the size of the incident pupil increases compared to the focal length so that the F-number becomes smaller than 1.7, aberration may increase and image quality may deteriorate. In some embodiments, when the F-number is greater than 2.0, the size of the incident pupil may become too small so that the amount of light that can be received may be reduced, and it may be difficult to obtain the image of the object in a dark environment.

According to an embodiment, the lens assembly 400 may satisfy the conditions of Equation 3 below.

$$1.6 \leq N2 \leq 12.0 \quad \text{[Equation 3]}$$

Here, "N2" may mean the refractive index of the second lens L2. In some embodiments, when the second lens L2 has positive refractive power and the third lens L3 has negative refractive power, the condition in which the refractive index of the third lens L3 is about 1.6 or more and about 2.0 or less may be satisfied. Of the second lens L2 and the third lens L3, the lens having negative refractive power is used for supplementing the refractive power of the first lens L1, and when the first lens L1 has a refractive index of less than 1.6, the effect of the lens L1 on the astigmatism may become small, and thus the astigmatism may increase. When, between the second lens L2 and the third lens L3, the refractive index of the lens having negative refractive power is low and the astigmatism increases, the image quality of the peripheral portion of the captured image may be deteriorated. In some embodiments, when, between the second lens L2 and the third lens L3, the refractive index of the lens having negative refractive power is greater than 2.0, it may be difficult to manufacture or mass produce the lens. In an embodiment, between the second lens L2 and the third lens L3, the lens having negative refractive power may be made of plastic material or glass material.

According to an embodiment, the lens assembly 400 may satisfy the condition of Equation 4 below.

$$0.7 \leq \frac{FL1}{FL} \leq 1.1 \quad \text{[Equation 4]}$$

Here, "FL1" may be the focal length of the first lens L1, and "FL" may indicate the focal length of the entire lens assembly 400. When the ratio of the focal length of the first lens L1 to the focal length of the entire lens assembly 400 is less than 0.7, the sensitivity of the first lens may be lowered, but the overall size of the lens assembly 400 is increased, which may make it difficult to miniaturize the lens assembly 400. In contrast, when the ratio of the focal length of the first lens L1 to the focal length of the entire lens assembly 400 is greater than 1.7, the lens assembly 400 may be easily miniaturized, but the sensitivity of the first lens L1 may be increased. As such, when the ratio of the focal length of the first lens L1 to the focal length of the entire lens assembly 400 satisfies the conditions of Equation 4, the lens assembly 400 may be miniaturized while having appropriate sensitivity.

According to an embodiment, the lens assembly 400 may satisfy the conditions of Equation 5 below.

$$0.8 \leq \frac{TTL}{FL} \leq 1.2 \quad \text{[Equation 5]}$$

Here, "TTL" may mean the distance measured on the optical axis O of the lens assembly 400 from the object side surface S2 of the first lens L1 to the image sensor side surface S19 of the ninth lens L9 (hereinafter, the "total lens length"), and "FL" may mean the focal length of the entire lens assembly 400. When the ratio of the total lens length to the focal length of the entire lens assembly 400 is less than 0.8, miniaturization of the lens assembly may be accomplished, but the sensitivity of the entire lens assembly 400 may be increased, and when the ratio is greater than 1.2, the sensitivity may be lowered, but there may be difficulty in miniaturization. For example, when the ratio of the total lens length to the focal length of the entire lens assembly 400 satisfies the conditions of [Equation 5], the lens assembly 400 may be miniaturized while having appropriate sensitivity.

Lens data of the lens assembly 400 according to certain embodiments are listed in Tables 1 to 12, in which "obj" may refer to an object whose image is to be captured. As described above, "S2 to S19" may refer to the object side surfaces and the image sensor side surfaces of the lenses L1, L2, L3, L4, L5, L6, L7, L8, and L9, respectively. "S1" may refer to the portion of the surface of the electronic device equipped with the lens assembly 400 (e.g., the electronic device 300 in FIG. 3 or 4), and "S20" may be the object side surface of the infrared filter IR.

Example 1

In the lens assembly 400 of FIG. 5, an iris may be disposed on the image sensor side surface S5 of the second lens L2 and may have a focal length of 8.5 mm, a field of view (FOV) of 42.7 degrees, and an F-number of 1.9. The lens assembly 400 may be manufactured with the specifications shown in Table 1 below.

TABLE 1

| Lens surface | Curvature | Thickness or air gap | Effective focal length | Refractive index | Abbe number |
|---|---|---|---|---|---|
| obj | infinity | infinity | | | |
| S1 | infinity | 0.105 | | | |
| S2 | 2.987 | 1.206 | 7.1524 | 1.5441 | 56.11 |
| S3 | 10.865 | 0.102 | | | |
| S4 | 10.221 | 0.34 | −14.5886 | 1.82114 | 24.06 |
| S5 | 5.456 | 0.375 | | | |
| S6 | 20.198 | 0.536 | 35.9252 | 1.56717 | 37.4 |
| S7 | 1340.5 | 0.24 | | | |
| S8 | 26.292 | 0.459 | −102.268 | 1.67073 | 19.23 |
| S9 | 18.935 | 0.488 | | | |
| S10 | −7.425 | 0.345 | −122.299 | 1.5441 | 56.11 |
| S11 | −8.49 | 0.118 | | | |
| S12 | 16.631 | 0.479 | −134.184 | 1.56717 | 37.4 |
| S13 | 13.521 | 0.513 | | | |
| S14 | 3.578 | 0.487 | 11.8794 | 1.5346 | 56.27 |
| S15 | 7.761 | 0.641 | | | |
| S16 | −30.54 | 0.483 | 48.1544 | 1.5441 | 56.11 |
| S17 | −14.215 | 0.979 | | | |
| S18 | −24.251 | 0.342 | −6.6182 | 1.5441 | 56.11 |
| S19 | 4.272 | 1 | | | |
| S20 | infinity | 0.11 | | 1.5168 | 64.2 |

The aspherical coefficients of the first to ninth lenses L1 to L9 are indicated in Tables 2 and 3 below, and may be calculated using Equation 6 below.

$$x = \frac{c'y^2}{1 + \sqrt{1 - (K+1)c'^2 y^2}} + Ay^4 + By^6 + \quad \text{[Equation 6]}$$
$$Cy^8 + Dy^{10} + Ey^{12} + Fy^{14} + Gy^{16} + Hy^{18} + Jy^{20}$$

Here, "x" may mean the distance from a lens vertex in the direction of the optical axis O, "y" may mean the distance in the direction perpendicular to the optical axis O, "c" may mean the inverse of the curvature radius at the vertex of the lens, "K" may mean a Conic constant, and "A", "B", "C", "D", "E", "F", "G", "H", and "J" may mean aspherical coefficients, respectively.

TABLE 2

|  | K | A | B | C | D |
|---|---|---|---|---|---|
| S2 | −8.729800.E−01 | 9.105624.E−03 | −1.032168.E−02 | 1.242291.E−02 | −8.716842.E−03 |
| S3 | 1.483943.E+01 | −2.139075.E−02 | 8.419052.E−03 | 5.431626.E−03 | −8.352008.E−03 |
| S4 | 1.828022.E+01 | −2.942752.E−02 | 2.587894.E−02 | −1.347722.E−02 | 5.831890.E−03 |
| S5 | 5.033560.E+00 | −2.002481.E−02 | 8.123960.E−02 | −1.892638.E−01 | 2.389506.E−01 |
| S6 | 1.184748.E+02 | −2.160774.E−02 | 5.646901.E−02 | −1.130424.E−01 | 1.384480.E−01 |
| S7 | −1.000000.E+00 | −3.176727.E−02 | 5.651401.E−02 | −9.642288.E−02 | 1.049776.E−01 |
| S8 | −1.562700.E+02 | −1.938210.E−02 | −2.894814.E−02 | 4.647113.E−02 | −4.141167.E−02 |
| S9 | 8.302399.E+01 | −1.399979.E−02 | −1.891010.E−02 | 2.374711.E−02 | −1.780946.E−02 |
| S10 | 7.026980.E+00 | 1.281081.E−02 | −1.492509.E−02 | 1.506599.E−02 | −1.208582.E−02 |
| S11 | 8.170110.E+00 | −4.574956.E−04 | 1.053983.E−03 | 5.510913.E−05 | −2.365576.E−03 |
| S12 | 2.169809.E+01 | −3.388082.E−02 | 1.216064.E−02 | −2.224953.E−03 | −8.513648.E−04 |
| S13 | −2.277382.E+01 | −5.581049.E−02 | 2.932655.E−02 | −1.318151.E−02 | 3.828389.E−03 |
| S14 | −6.518120.E+00 | 6.603481.E−03 | −4.421375.E−03 | 4.400888.E−04 | −3.251321.E−05 |
| S15 | −2.125132.E+01 | 3.349633.E−02 | −1.579484.E−02 | 3.587466.E−03 | −5.125002.E−04 |
| S16 | 5.415600.E+00 | −1.526570.E−02 | 2.761214.E−04 | −5.015348.E−05 | 5.224054.E−06 |
| S17 | −3.461220.E+01 | −1.095973.E−03 | 7.344940.E−04 | −1.121134.E−04 | 9.068272.E−06 |
| S18 | 4.826860.E+00 | −5.426445.E−02 | 1.426166.E−02 | −2.136756.E−03 | 2.159802.E−04 |
| S19 | −2.566892.E+01 | −3.093188.E−02 | 7.222859.E−03 | −1.026555.E−03 | 9.204542.E−05 |

TABLE 3

|  | E | F | G | H | J |
|---|---|---|---|---|---|
| S2 | 3.820448.E−03 | −1.054535.E−03 | 1.779949.E−04 | −1.677869.E−05 | 6.749569.E−07 |
| S3 | 4.615574.E−03 | −1.415643.E−03 | 2.526905.E−04 | −2.459331.E−05 | 1.010477.E−06 |
| S4 | −2.522736.E−03 | 9.320846.E−04 | −2.288786.E−04 | 3.118041.E−05 | −1.770241.E−06 |
| S5 | −1.734009.E−01 | 7.508145.E−02 | −1.919114.E−02 | 2.674586.E−03 | −1.568064.E−04 |
| S6 | −1.044549.E−01 | 4.897291.E−02 | −1.388815.E−02 | 2.181012.E−03 | −1.456082.E−04 |
| S7 | −7.191897.E−02 | 3.103527.E−02 | −8.178605.E−03 | 1.200607.E−03 | −7.516471.E−05 |
| S8 | 2.197814.E−02 | −6.988675.E−03 | 1.253697.E−03 | −1.079548.E−04 | 2.642006.E−06 |
| S9 | 8.094523.E−03 | −2.248008.E−03 | 3.612882.E−04 | −2.909499.E−05 | 7.880915.E−07 |
| S10 | 6.397685.E−03 | −2.123843.E−03 | 4.194413.E−04 | −4.474174.E−05 | 1.981625.E−06 |
| S11 | 1.920432.E−03 | −6.802891.E−04 | 1.253742.E−04 | −1.178222.E−05 | 4.469460.E−07 |
| S12 | 5.858468.E−04 | −1.366733.E−04 | 1.572003.E−05 | −8.955900.E−07 | 2.020562.E−08 |
| S13 | −6.647976.E−04 | 6.929220.E−05 | −4.271839.E−06 | 1.440550.E−07 | −2.054086.E−09 |
| S14 | 4.845970.E−06 | −5.277380.E−07 | 2.931364.E−08 | −7.958689.E−10 | 8.483411.E−12 |
| S15 | 4.794560.E−05 | −2.932025.E−06 | 1.130076.E−07 | −2.495113.E−09 | 2.409046.E−11 |
| S16 | −3.000689.E−07 | 9.948816.E−09 | −1.904554.E−10 | 1.957287.E−12 | −8.395996.E−15 |
| S17 | −4.388516.E−07 | 1.311392.E−08 | −2.372448.E−10 | 2.384199.E−12 | −1.019741.E−14 |
| S18 | −1.481549.E−05 | 6.712647.E−07 | −1.912349.E−08 | 3.095035.E−10 | −2.167836.E−12 |
| S19 | −5.304415.E−06 | 1.960031.E−07 | −4.491123.E−09 | 5.818330.E−11 | −3.266824.E−13 |

Example 2

Figure 7:
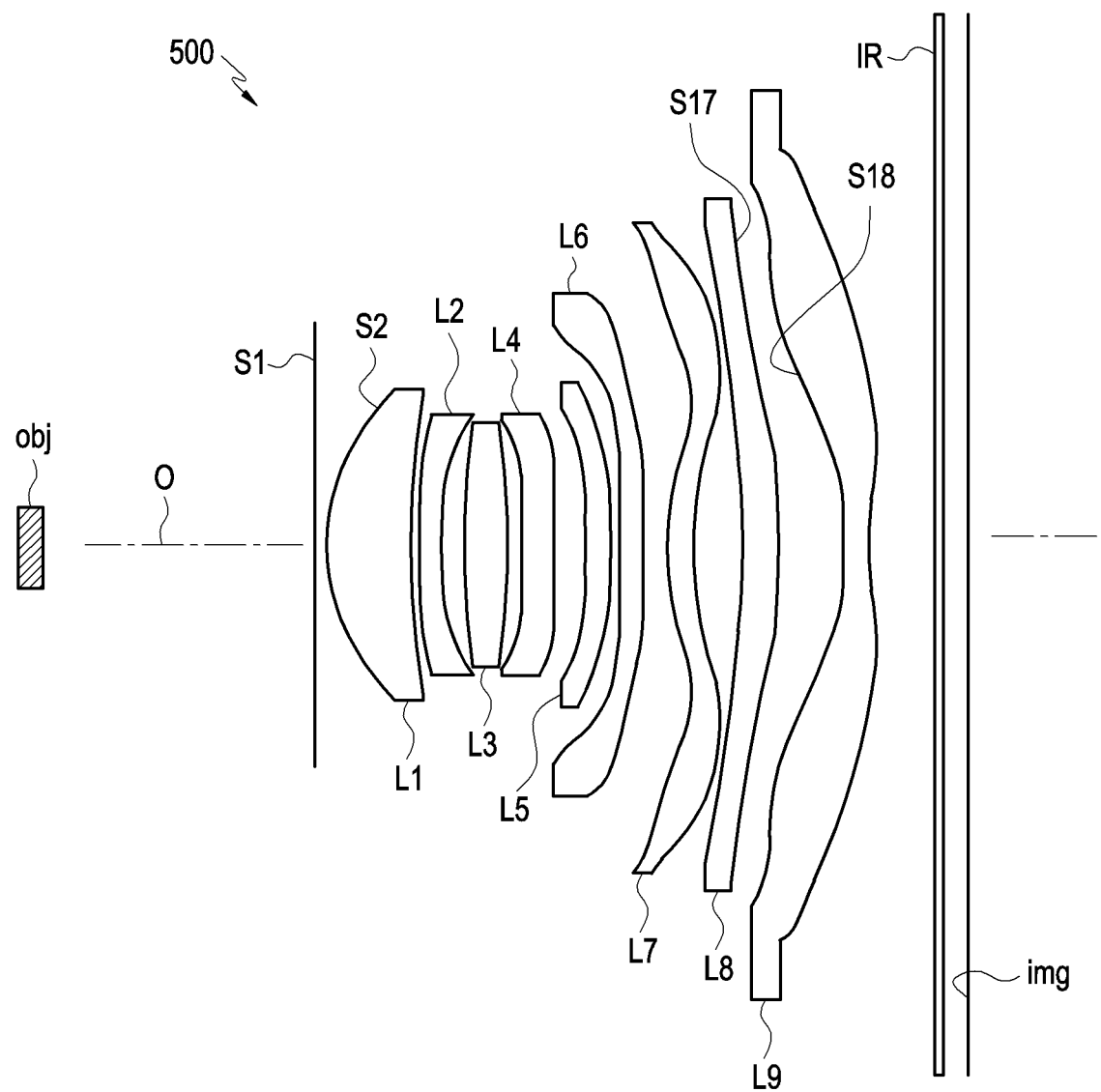
FIG. 7 is a view illustrating the configuration of a lens assembly according to another one of various embodiments disclosed herein.
Figure 8:
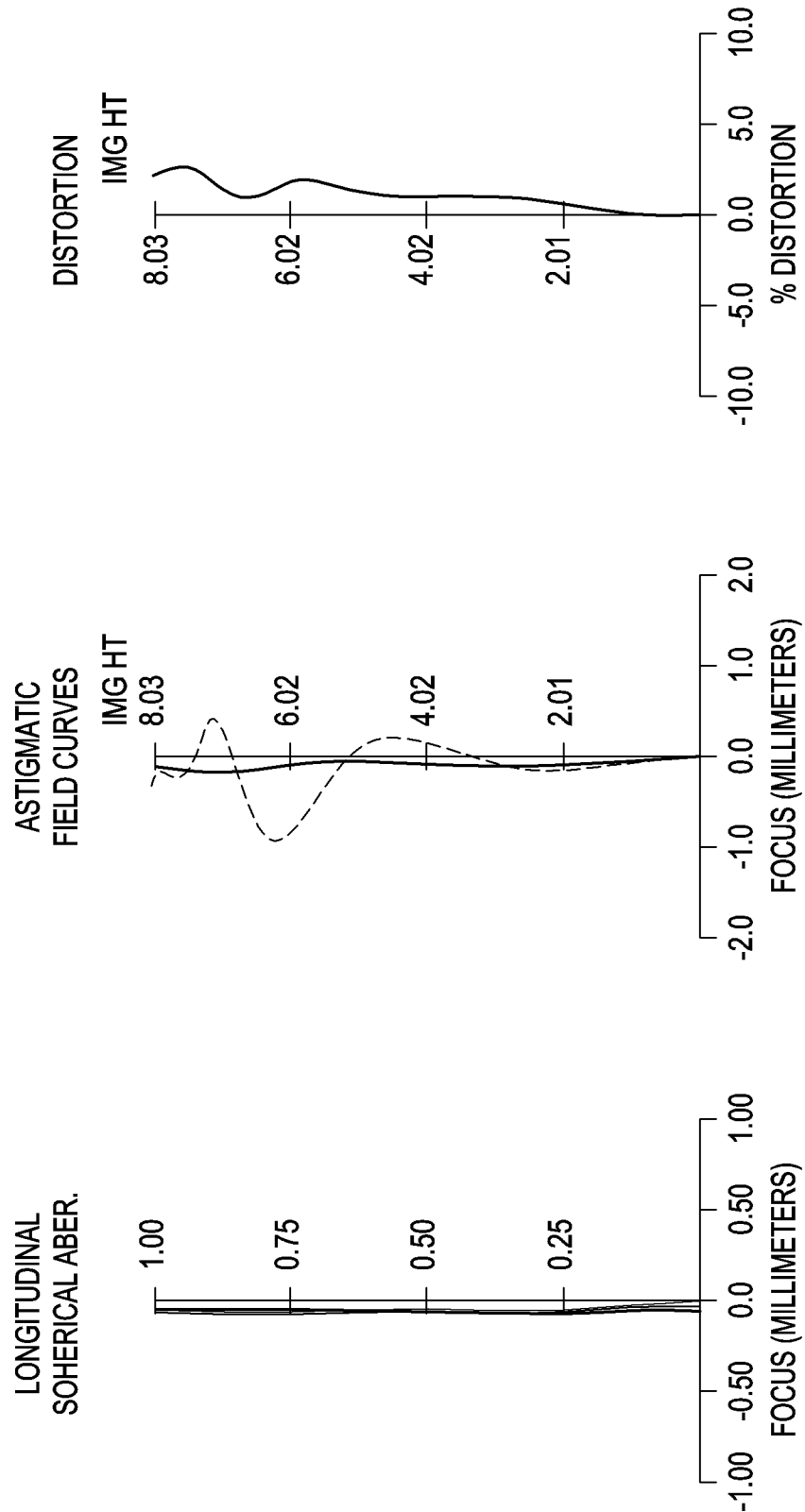
FIGS. 8A to 8C are graphs illustrating respectively the spherical aberration, the astigmatism, and the distortion rate of the lens assembly according to another one of various embodiments disclosed herein.

FIG. 7 is a configuration view illustrating a lens assembly 500 (e.g., the lens assembly 400 in FIG. 5) according to another one of various embodiments disclosed herein. FIGS. 8A to 8C are graphs respectively illustrating spherical aberration, astigmatism, and distortion rate of the lens assembly 500 according to another one of various embodiments disclosed herein.

In the lens assembly 500 of FIG. 7, an iris may be disposed on the object side surface S6 of the third lens L3, may have a focal length of 8.1 mm, an angle of view of 44.2 degrees, and an F-number of 1.9. The lens assembly 500 may be manufactured with the specifications shown in Table 4 below, and may have aspherical coefficients of Tables 5 and 6.

TABLE 4

| Lens surface | Curvature | Thickness or Air gap | Effective focal length | Refractive index | Abbe number |
|---|---|---|---|---|---|
| Obj | infinity | infinity | | | |
| S1 | infinity | 0.1 | | | |
| S2 | 2.996 | 1.206 | 7.4559 | 1.5441 | 56.11 |
| S3 | 9.702 | 0.1 | | | |
| S4 | 10.839 | 0.393 | −17.1364 | 1.67975 | 18.41 |
| S5 | 5.565 | 0.313 | | | |
| S6 | 22.126 | 0.565 | 36.9801 | 1.56717 | 37.4 |
| S7 | −453.482 | 0.245 | | | |
| S8 | 25.416 | 0.461 | −152.48 | 1.67073 | 19.23 |
| S9 | 20.256 | 0.49 | | | |
| S10 | −7.296 | 0.358 | −127.217 | 1.5441 | 56.11 |
| S11 | −8.293 | 0.113 | | | |
| S12 | 16.2 | 0.342 | −185.724 | 1.56717 | 37.4 |
| S13 | 13.945 | 0.339 | | | |
| S14 | 3.042 | 0.412 | 13.5333 | 1.5346 | 56.27 |
| S15 | 4.984 | 0.7 | | | |
| S16 | −15.103 | 0.534 | 30.1289 | 1.5346 | 56.27 |
| S17 | −7.907 | 0.946 | | | |
| S18 | −20.876 | 0.363 | −6.8402 | 1.5441 | 56.11 |
| S19 | 4.581 | 1 | | | |
| S20 | infinity | 0.11 | | 1.5168 | 64.2 |

TABLE 5

|  | K | A | B | C | D |
|---|---|---|---|---|---|
| S2 | −9.461900.E−01 | 3.062485.E−03 | 1.518366.E−03 | −1.118657.E−03 | 6.089837.E−04 |
| S3 | 1.504738.E+01 | −2.582841.E−02 | 2.154184.E−02 | −1.029490.E−02 | 2.712968.E−03 |
| S4 | 2.430276.E+01 | −3.545994.E−02 | 3.931117.E−02 | −2.369023.E−02 | 8.858642.E−03 |
| S5 | 5.087890.E+00 | −2.267519.E−02 | 3.467142.E−02 | −3.118929.E−02 | 1.892024.E−02 |
| S6 | 1.238677.E+02 | −1.266686.E−02 | 1.028486.E−02 | −9.873687.E−03 | 7.987401.E−03 |
| S7 | −1.000000.E+00 | −2.884675.E−02 | 2.875597.E−02 | −2.581476.E−02 | 1.604766.E−02 |
| S8 | −2.792124.E+02 | −2.565530.E−02 | −5.088772.E−03 | 4.753853.E−03 | −1.554869.E−03 |
| S9 | 8.198700.E+01 | −1.079824.E−02 | −1.915294.E−02 | 1.616557.E−02 | −7.812673.E−03 |
| S10 | 6.697560.E+00 | 1.261739.E−02 | −1.321113.E−02 | 1.052223.E−02 | −5.031452.E−03 |
| S11 | 8.130400.E+00 | −1.028862.E−03 | −2.538349.E−03 | 1.744012.E−03 | −6.949195.E−04 |
| S12 | 7.576950.E+00 | −2.112993.E−02 | 7.779954.E−04 | −1.578388.E−04 | 3.297672.E−04 |
| S13 | −1.391364.E+01 | −3.908459.E−03 | 5.238058.E−03 | 3.464874.E−04 | −1.257935.E−04 |
| S14 | −6.643860.E+00 | 6.320783.E−03 | −4.771923.E−03 | 4.766869.E−04 | −9.637186.E−06 |
| S15 | −1.662788.E+01 | 2.432080.E−03 | −8.710214.E−03 | 1.252028.E−03 | −1.008625.E−04 |
| S16 | −2.330995.E+01 | −3.680246.E−04 | −9.540171.E−05 | 1.551493.E−05 | −8.188966.E−07 |
| S17 | −6.261580.E+00 | 4.795183.E−05 | 1.431715.E−04 | −9.781011.E−06 | 3.115107.E−07 |
| S18 | −6.265100.E−01 | −4.745244.E−02 | 9.885942.E−03 | −1.013570.E−03 | 6.109881.E−05 |
| S19 | −2.353069.E+01 | −2.746606.E−02 | 5.884359.E−03 | −7.922066.E−04 | 6.929182.E−05 |

TABLE 6

|  | E | F | G | H | J |
|---|---|---|---|---|---|
| S2 | −1.914062.E−04 | 3.087069.E−05 | −2.004830.E−06 | 8.650852.E−19 | 4.103831.E−20 |
| S3 | −3.653044.E−04 | 1.893954.E−05 | −8.796134.E−18 | −3.672316.E−19 | 9.591471.E−22 |
| S4 | −2.035251.E−03 | 2.651923.E−04 | −1.505097.E−05 | 1.250990.E−20 | 1.614213.E−21 |
| S5 | −7.144133.E−03 | 1.471878.E−03 | −1.230250.E−04 | 2.524893.E−20 | 1.470823.E−21 |
| S6 | −3.914129.E−03 | 9.959302.E−04 | −9.900967.E−05 | 2.508462.E−20 | 1.471428.E−21 |
| S7 | −6.133901.E−03 | 1.295870.E−03 | −1.147712.E−04 | 2.506382.E−20 | 1.475567.E−21 |
| S8 | −4.888312.E−05 | 1.140368.E−04 | −1.629143.E−05 | 1.980577.E−20 | 1.465046.E−21 |
| S9 | 2.074730.E−03 | −2.887113.E−04 | 1.680198.E−05 | 1.504994.E−20 | 6.822869.E−22 |
| S10 | 1.260113.E−03 | −1.584360.E−04 | 8.057114.E−06 | −2.300533.E−19 | 8.583324.E−22 |
| S11 | 1.520718.E−04 | −1.686031.E−05 | 7.442151.E−07 | −7.181200.E−19 | −4.614271.E−21 |
| S12 | −8.821944.E−05 | 8.425448.E−06 | −2.739434.E−07 | 1.930019.E−11 | 3.933254.E−12 |
| S13 | 8.565886.E−06 | −9.921866.E−08 | −5.066288.E−09 | −2.934977.E−12 | −5.777135.E−13 |
| S14 | −9.161343.E−07 | 5.336005.E−08 | −8.252224.E−10 | −5.048373.E−14 | −3.217149.E−15 |
| S15 | 4.675788.E−06 | −1.165568.E−07 | 1.211875.E−09 | 3.285376.E−14 | 1.112914.E−15 |
| S16 | 2.052214.E−08 | −2.553220.E−10 | 1.265581.E−12 | −1.750594.E−16 | −1.195140.E−17 |
| S17 | −4.961928.E−09 | 3.200239.E−11 | −9.791572.E−14 | −1.374234.E−15 | −3.493682.E−17 |
| S18 | −2.183168.E−06 | 4.265130.E−08 | −3.505353.E−10 | −5.041942.E−16 | 2.929068.E−18 |
| S19 | −4.014749.E−06 | 1.535372.E−07 | −3.725034.E−09 | 5.183909.E−11 | −3.144837.E−13 |

Example 3

Figure 9:
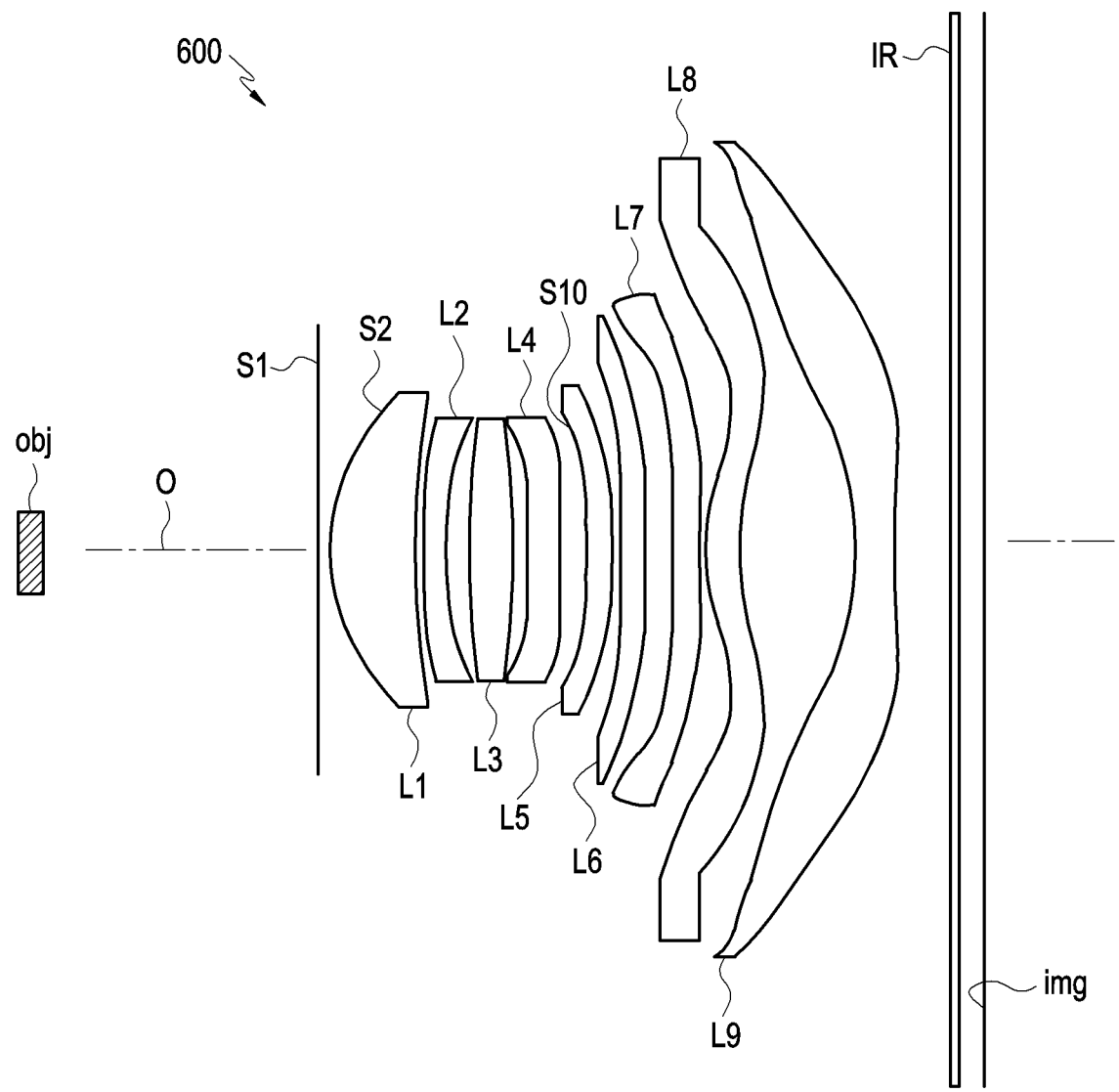
FIG. 9 is a view illustrating the configuration of a lens assembly according to still another one of various embodiments disclosed herein.
Figure 10:
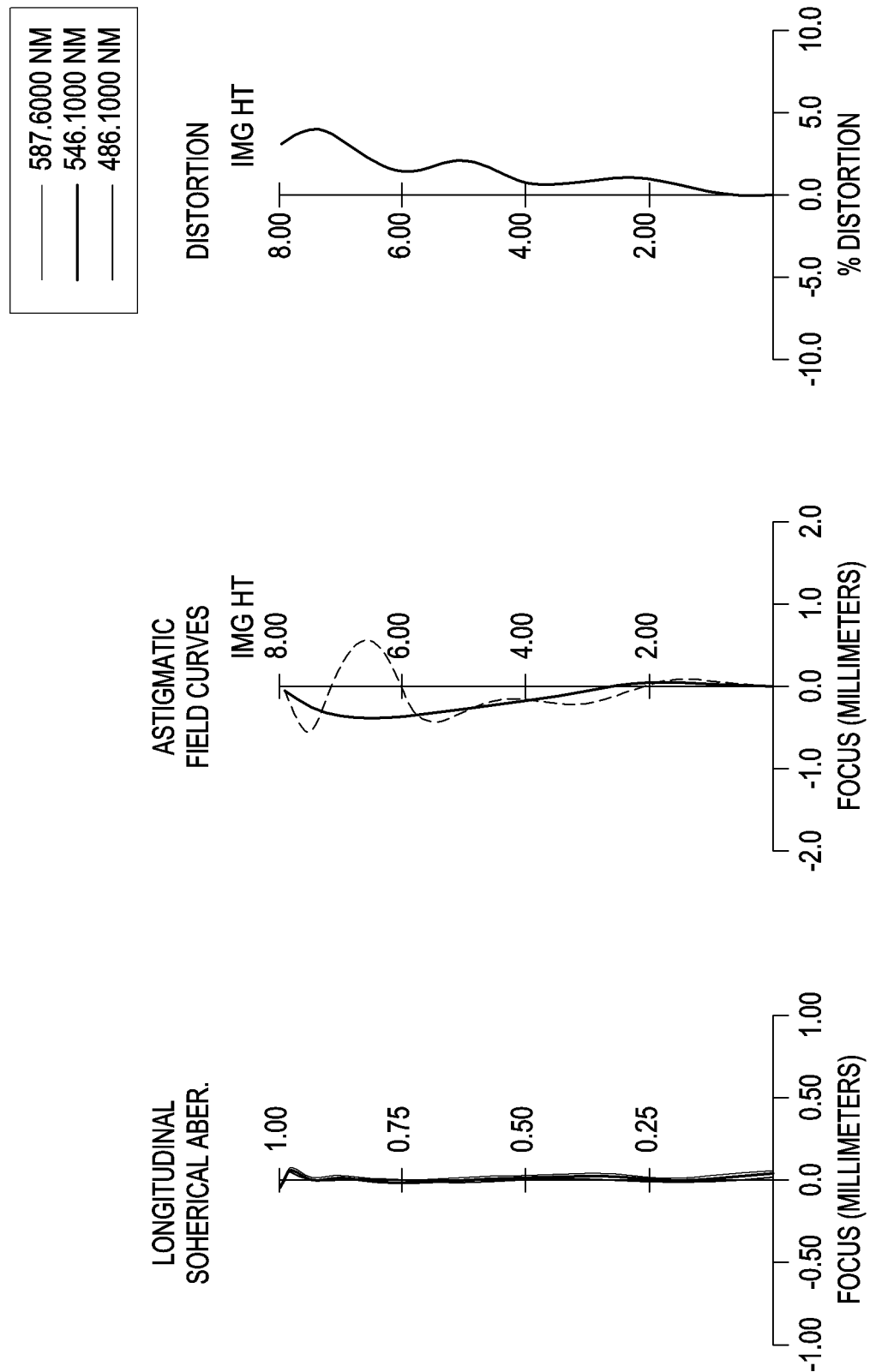
FIGS. 10A to 10C are graphs illustrating respectively the spherical aberration, the astigmatism, and the distortion rate of the lens assembly according to still another one of various embodiments disclosed herein.

FIG. 9 is a configuration view illustrating a lens assembly 600 (e.g., the lens assembly 400 in FIG. 5) according to yet another one of various embodiments disclosed herein. FIGS. 10A to 10C are graphs respectively illustrating spherical aberration, astigmatism, and distortion rate of the lens assembly 500 according to yet another one of various embodiments disclosed herein.

In the lens assembly 600 of FIG. 9, an iris may be disposed on the object side surface S6 of the third lens L3, and may have a focal length of 7.9 mm, an angle of view of 44.5 degrees, and an F-number of 1.7. The lens assembly 600 may be manufactured with the specifications shown in Table 7 below, and may have aspherical coefficients of Tables 8 and 9.

TABLE 7

| Lens surface | Curvature | Thickness or air gap | Effective focal length | Refractive index | Abbe number |
|---|---|---|---|---|---|
| Obj | infinity | infinity |  |  |  |
| S1 | infinity | 0 |  |  |  |
| S2 | 3.065 | 1.267 | 7.4317 | 1.5441 | 56.11 |
| S3 | 10.674 | 0.1 |  |  |  |
| S4 | 9.99 | 0.38 | −19.8893 | 1.67073 | 19.23 |
| S5 | 5.653 | 0.348 |  |  |  |
| S6 | 21.442 | 0.596 | 58.379 | 1.56717 | 37.4 |
| S7 | 59.544 | 0.197 |  |  |  |
| S8 | 18.732 | 0.414 | 660.3364 | 1.67073 | 19.23 |
| S9 | 19.374 | 0.401 |  |  |  |
| S10 | −7.578 | 0.397 | −90.4017 | 1.5441 | 56.11 |
| S11 | −9.116 | 0.1 |  |  |  |
| S12 | 17.766 | 0.382 | −125.847 | 1.56717 | 37.4 |
| S13 | 14.132 | 0.354 |  |  |  |
| S14 | 16.305 | 0.389 | −23.3591 | 1.56717 | 37.4 |
| S15 | 7.271 | 0.1 |  |  |  |
| S16 | 2.362 | 0.504 | 7.7443 | 1.5346 | 56.27 |
| S17 | 5.061 | 1.623 |  |  |  |
| S18 | −13.64 | 0.652 | −8.3148 | 1.5441 | 56.11 |
| S19 | 6.929 | 0.7 |  |  |  |
| S20 | infinity | 0.11 |  | 1.5168 | 64.2 |

TABLE 8

|  | K | A | B | C | D |
|---|---|---|---|---|---|
| S2 | −9.202400.E−01 | 2.680884.E−03 | 5.094403.E−04 | 6.529305.E−04 | −6.940694.E−04 |
| S3 | 1.551250.E+01 | −2.155748.E−02 | 1.546261.E−02 | −6.655174.E−03 | 2.311376.E−03 |
| S4 | 1.801770.E+01 | −2.466539.E−02 | 1.470072.E−02 | 3.867083.E−03 | −1.072662.E−02 |
| S5 | 4.960070.E+00 | −1.112355.E−02 | −9.904047.E−04 | 2.794919.E−02 | −3.994784.E−02 |
| S6 | 1.198160.E+02 | −5.047580.E−03 | −7.700822.E−03 | 1.588820.E−02 | −1.216753.E−02 |
| S7 | 3.162084.E+02 | −1.727368.E−02 | 8.564280.E−03 | −1.050010.E−02 | 1.359602.E−02 |
| S8 | −6.803114.E+01 | −1.983761.E−02 | −3.240949.E−02 | 7.155658.E−02 | −8.861985.E−02 |
| S9 | 8.663898.E+01 | −1.927416.E−02 | −1.790627.E−03 | 6.461047.E−03 | −9.643268.E−03 |
| S10 | 6.760220.E+00 | 1.544575.E−02 | −6.331391.E−03 | −4.739436.E−03 | 6.588233.E−03 |
| S11 | 8.740250.E+00 | 1.112013.E−02 | −1.757107.E−02 | 8.515276.E−03 | −2.112249.E−03 |
| S12 | 2.953394.E+01 | −3.001403.E−02 | 1.288781.E−02 | −6.238184.E−03 | 1.751097.E−03 |
| S13 | −5.775472.E+01 | −5.118122.E−02 | 3.151360.E−02 | −1.435019.E−02 | 3.904553.E−03 |
| S14 | 1.746836.E+01 | −2.406557.E−02 | 3.637658.E−03 | −8.017569.E−05 | −3.419860.E−04 |
| S15 | −3.050434.E+01 | −4.876425.E−02 | 2.018106.E−02 | −8.104482.E−03 | 2.309125.E−03 |
| S16 | −9.055770.E+00 | 7.679024.E−03 | −5.286280.E−03 | 5.737304.E−04 | −2.125866.E−05 |
| S17 | −3.397056.E+01 | 3.025264.E−02 | −1.243584.E−02 | 2.233406.E−03 | −2.373315.E−04 |
| S18 | 1.095480.E+00 | −3.882151.E−02 | 7.667370.E−03 | −8.036626.E−04 | 5.681379.E−05 |
| S19 | −6.793642.E+01 | −2.343383.E−02 | 3.894228.E−03 | −4.246795.E−04 | 2.943448.E−05 |

TABLE 9

|  | E | F | G | H | J |
|---|---|---|---|---|---|
| S2 | 3.086502.E−04 | −7.504532.E−05 | 1.054355.E−05 | −8.259513.E−07 | 2.814741.E−08 |
| S3 | −9.328189.E−04 | 3.475916.E−04 | −8.414373.E−05 | 1.096754.E−05 | −5.830427.E−07 |
| S4 | 7.264852.E−03 | −2.666841.E−03 | 5.685093.E−04 | −6.592247.E−05 | 3.212398.E−06 |
| S5 | 2.882817.E−02 | −1.214969.E−02 | 3.023598.E−03 | −4.119375.E−04 | 2.370331.E−05 |
| S6 | 4.802570.E−03 | −8.602757.E−04 | −1.273709.E−03 | 2.893594.E−05 | −3.184326.E−06 |
| S7 | −1.044932.E−02 | 4.657602.E−03 | −1.208692.E−03 | 1.715927.E−04 | −1.039894.E−05 |
| S8 | 6.642107.E−02 | −3.043640.E−02 | 8.277404.E−03 | −1.223395.E−03 | 7.555891.E−05 |
| S9 | 7.199339.E−03 | −3.028551.E−03 | 7.264196.E−04 | −9.289524.E−05 | 4.931622.E−06 |
| S10 | −3.079665.E−03 | 6.507753.E−04 | −4.609189.E−05 | −3.466534.E−06 | 4.952178.E−07 |
| S11 | 2.824807.E−04 | −1.909177.E−05 | 5.039118.E−07 | 1.660451.E−11 | 2.476694.E−17 |
| S12 | −2.531559.E−04 | 1.769661.E−05 | −4.746272.E−07 | 3.727665.E−11 | 5.368022.E−14 |
| S13 | −6.347677.E−04 | 6.283011.E−05 | −3.728745.E−06 | 1.223174.E−07 | −1.709479.E−09 |
| S14 | 1.671696.E−04 | −3.592274.E−05 | 3.879908.E−06 | −2.062752.E−07 | 4.306614.E−09 |
| S15 | −3.989422.E−04 | 4.118841.E−05 | −2.501248.E−06 | 8.273287.E−08 | −1.153123.E−09 |
| S16 | −1.571056.E−07 | 2.865868.E−08 | −5.085290.E−10 | −2.215293.E−15 | −4.159909.E−16 |
| S17 | 1.564157.E−05 | −6.312395.E−07 | 1.462296.E−08 | −1.652749.E−10 | 5.496626.E−13 |
| S18 | −2.865101.E−06 | 1.013562.E−07 | −2.371032.E−09 | 3.270012.E−11 | −2.001484.E−13 |
| S19 | −1.309979.E−06 | 3.795019.E−08 | −7.033479.E−10 | 7.653002.E−12 | −3.729116.E−14 |

Example 4

Figure 11:
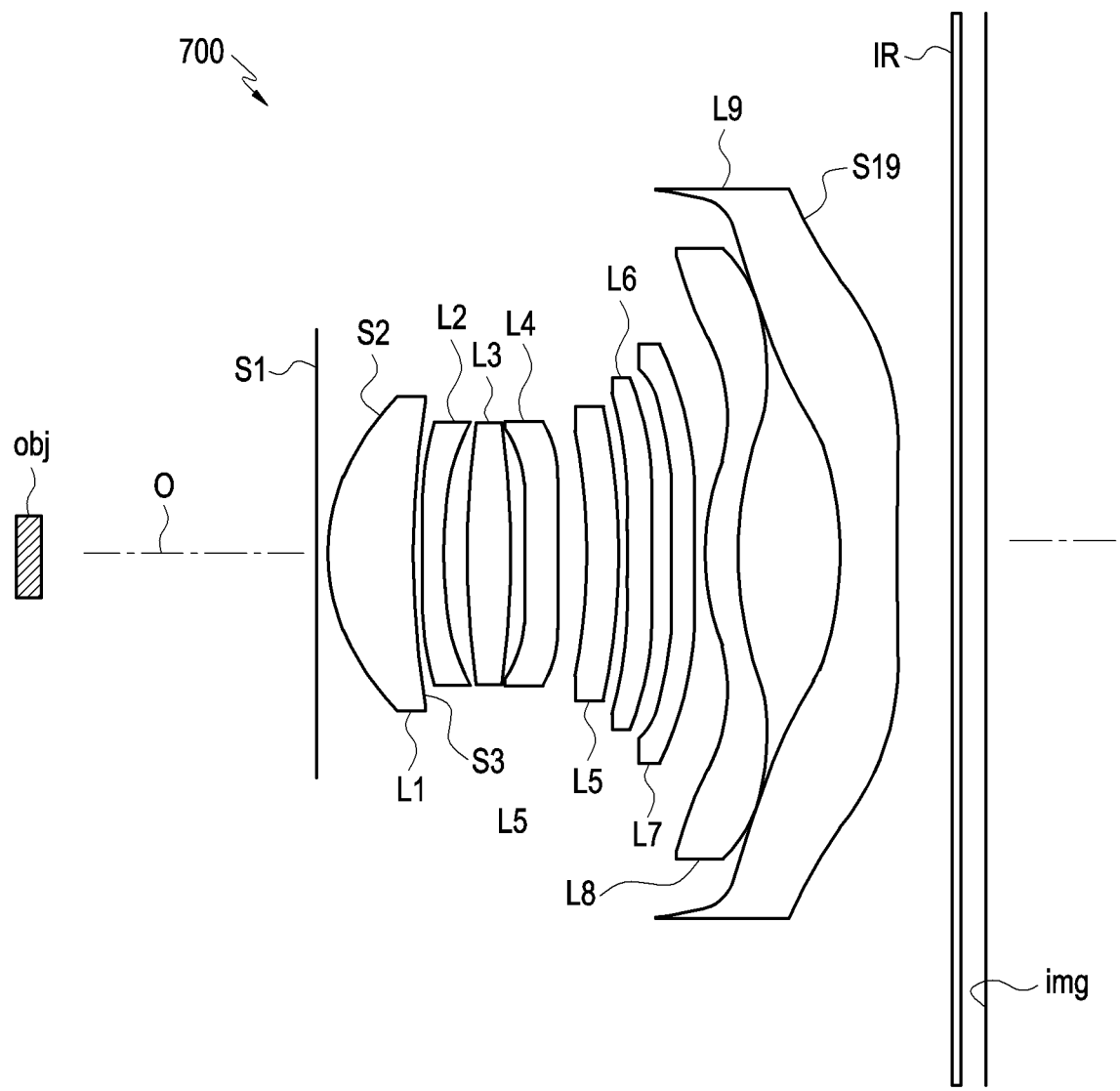
FIG. 11 is a view illustrating the configuration of a lens assembly according to still yet another one of various embodiments disclosed herein.

FIG. 11 is a view illustrating the configuration of a lens assembly 700 (e.g., the lens assembly 400 in FIG. 5) according to still yet another one of various embodiments disclosed herein. FIGS. 12A to 12C are graphs respectively illustrating spherical aberration, astigmatism, and distortion rate of the lens assembly 700 according to still yet another one of various embodiments disclosed herein.

In the lens assembly 700 of FIG. 11, an iris may be disposed on the image sensor side surface S7 of the third lens L3, and may have a focal length of 8.4 mm, an angle of view of 43.0 degrees, and an F-number of 1.9. The lens assembly may be manufactured with the specifications shown in Table 10 below, and may have aspherical coefficients of Tables 11 and 12.

TABLE 10

| Lens surface | Curvature | Thickness or air gap | Effective focal length | Refractive index | Abbe number |
|---|---|---|---|---|---|
| Obj | infinity | infinity |  |  |  |
| S1 | infinity | 0 |  |  |  |
| S2 | 3.056 | 1.323 | 7.3455 | 1.5441 | 56.11 |
| S3 | 10.846 | 0.1 |  |  |  |
| S4 | 12.654 | 0.34 | −18.3248 | 1.82114 | 24.06 |
| S5 | 6.82 | 0.41 |  |  |  |
| S6 | 21.329 | 0.511 | 47.2568 | 1.56717 | 37.4 |
| S7 | 101.07 | 0.23 |  |  |  |
| S8 | 23.308 | 0.395 | 2229.413 | 1.67073 | 19.23 |
| S9 | 23.511 | 0.458 |  |  |  |
| S10 | −8.649 | 0.454 | −78.0332 | 1.5441 | 56.11 |
| S11 | −11.05 | 0.1 |  |  |  |
| S12 | 19.937 | 0.382 | −215.022 | 1.56717 | 37.4 |
| S13 | 17.031 | 0.259 |  |  |  |
| S14 | 20.85 | 0.352 | −39.2517 | 1.56717 | 37.4 |
| S15 | 10.733 | 0.136 |  |  |  |
| S16 | 2.843 | 0.496 | 9.8266 | 1.5346 | 56.27 |
| S17 | 5.79 | 1.455 |  |  |  |
| S18 | −12.376 | 0.802 | −8.6534 | 1.5441 | 56.11 |
| S19 | 7.829 | 1.102 |  |  |  |
| S20 | infinity | 0.11 |  | 1.5168 | 64.2 |

TABLE 11

|  | K | A | B | C | D |
|---|---|---|---|---|---|
| S2 | −8.831400.E−01 | 6.913453.E−03 | −7.872583.E−03 | 8.267642.E−03 | −4.829616.E−03 |
| S3 | 1.436698.E+01 | −2.412009.E−02 | 1.971950.E−02 | −9.475684.E−03 | 2.549379.E−03 |
| S4 | 2.057788.E+01 | −2.811587.E−02 | 3.327415.E−02 | −2.528103.E−02 | 1.375960.E−02 |
| S5 | 5.041700.E+00 | −7.903432.E−04 | −1.212001.E−02 | 2.765242.E−02 | −2.890590.E−02 |
| S6 | 1.138426.E+02 | −5.423117.E−03 | −6.668430.E−03 | 1.737604.E−02 | −1.932568.E−02 |
| S7 | 1.920184.E+03 | −1.567770.E−02 | 1.051911.E−02 | −1.279881.E−02 | 1.347942.E−02 |
| S8 | −1.290210.E+02 | −2.360414.E−02 | −1.495654.E−02 | 3.345114.E−02 | −4.157419.E−02 |
| S9 | 8.570997.E+01 | −1.990116.E−02 | 3.837797.E−03 | −1.184266.E−02 | 1.689032.E−02 |
| S10 | −7.203380.E+00 | 7.169835.E−03 | −1.763186.E−02 | 2.476835.E−02 | −1.895039.E−02 |
| S11 | 4.772220.E+00 | −1.174837.E−03 | 5.789124.E−03 | −1.153180.E−02 | 9.703412.E−03 |
| S12 | 3.263299.E+01 | −3.296563.E−02 | 1.382350.E−02 | 9.241398.E−04 | −5.226732.E−03 |
| S13 | −4.330409.E+01 | −7.220743.E−02 | 5.462440.E−02 | −2.672672.E−02 | 7.594840.E−03 |
| S14 | 8.713330.E+00 | −5.345317.E−03 | −2.798292.E−02 | 2.484469.E−02 | −1.194921.E−02 |
| S15 | −5.688076.E+01 | −2.943923.E−02 | −2.841842.E−03 | 1.319241.E−03 | 7.027771.E−04 |
| S16 | −8.514450.E+00 | 2.195064.E−02 | −1.852758.E−02 | 5.347511.E−03 | −9.218999.E−04 |
| S17 | −1.634374.E+01 | 3.375507.E−02 | −1.528373.E−02 | 3.284427.E−03 | −4.443111.E−04 |
| S18 | 3.299900.E−01 | −4.223267.E−02 | 9.726072.E−03 | −1.405934.E−03 | 1.606696.E−04 |
| S19 | −2.893652.E+01 | −2.202890.E−02 | 3.235660.E−03 | −2.859524.E−04 | 1.441298.E−05 |

TABLE 12

|  | E | F | G | H | J |
|---|---|---|---|---|---|
| S2 | 1.791546.E−03 | −4.261646.E−04 | 6.283188.E−05 | −5.207154.E−06 | 1.837265.E−07 |
| S3 | −2.829827.E−04 | −4.198870.E−05 | 1.863436.E−05 | −2.431145.E−06 | 1.161988.E−07 |
| S4 | −5.400092.E−03 | 1.472733.E−03 | −2.609273.E−04 | 2.675179.E−05 | −1.197800.E−06 |
| S5 | 1.771161.E−02 | −6.648004.E−03 | 1.504760.E−03 | −1.880405.E−04 | 9.919930.E−06 |
| S6 | 1.285347.E−02 | −5.258551.E−03 | 1.296316.E−03 | −1.762128.E−04 | 1.014099.E−05 |
| S7 | −9.238832.E−03 | 3.950500.E−03 | −1.019782.E−03 | 1.452242.E−04 | −8.732060.E−06 |
| S8 | 3.105502.E−02 | −1.443428.E−02 | 4.096639.E−03 | −6.511400.E−04 | 4.433800.E−05 |
| S9 | −1.373028.E−02 | 6.627262.E−03 | −1.868661.E−03 | 2.834868.E−04 | −1.784603.E−05 |
| S10 | 8.582640.E−03 | −2.358037.E−03 | 3.808797.E−04 | −3.233523.E−05 | 1.039430.E−06 |
| S11 | −4.331792.E−03 | 1.103482.E−03 | −1.595767.E−04 | 1.199263.E−05 | −3.530765.E−07 |
| S12 | 2.905922.E−03 | −8.092539.E−04 | 1.273694.E−04 | −1.082388.E−05 | 3.869347.E−07 |
| S13 | −1.287563.E−03 | 1.330700.E−04 | −8.246906.E−06 | 2.823203.E−07 | −4.108645.E−09 |
| S14 | 3.572614.E−03 | −6.738976.E−04 | 7.793465.E−05 | −5.053881.E−06 | 1.408413.E−07 |
| S15 | −3.556804.E−04 | 6.551455.E−05 | −6.178970.E−06 | 2.978936.E−07 | −5.796319.E−09 |
| S16 | 9.905018.E−05 | −6.587892.E−06 | 2.628423.E−07 | −5.759330.E−09 | 5.327349.E−11 |
| S17 | 3.950541.E−05 | −2.297946.E−06 | 8.411235.E−08 | −1.758447.E−09 | 1.601843.E−11 |
| S18 | −1.377627.E−05 | 8.028828.E−07 | −2.928413.E−08 | 5.981180.E−10 | −5.204405.E−12 |
| S19 | −4.004643.E−07 | 5.685031.E−09 | −3.201678.E−11 | 0.000000.E+00 | 0.000000.E+00 |

According to certain embodiments, as illustrated in Table 13 below, the lens assemblies 400, 500, 600, 700 of the above-described Examples 1 to 4 may satisfy the conditions of Equations 1 to 5.

TABLE 13

|  | Equation 1 $20 \leq v3 \leq 40$ | Equation 2 $1.7 \leq Fno \leq 2.0$ | Equation 3 $1.6 \leq N2 \leq 2.0$ | Equation 4 $0.7 \leq \frac{FL1}{FL} \leq 1.1$ | Equation 5 $0.8 \leq \frac{TTL}{FL} \leq 1.2$ |
|---|---|---|---|---|---|
| Example 1 | 37.4 | 1.946 | 1.82114 | 0.844938 | 0.96078 |
| Example 2 | 37.4 | 1.934 | 1.67975 | 0.9226 | 0.975079 |
| Example 3 | 37.4 | 1.737 | 1.67073 | 0.936678 | 1.034018 |
| Example 4 | 37.4 | 1.861 | 1.82114 | 0.870526 | 0.97215 |

According to certain embodiments, even when the lens assemblies 400, 500, 600, and 700 include at least nine lenses, it is possible to reduce the size of the lens assemblies while providing aberration control performance suitable for a large-sized image sensor. For example, the lens assemblies 400, 500, 600, and 700 according to certain embodiments disclosed herein may be particularly suitable for miniaturized electronic devices such as smartphones, and high performance may be implemented in imaging.

According to an embodiment disclosed herein, a lens assembly (e.g., the camera module 180, 280, 305, 312, or 313 in FIGS. 1 to 4 or the lens assembly 400 in FIG. 5) and/or an electronic device (e.g., the electronic device 101, 102, 104, or 300 of FIG. 1, FIG. 3, or FIG. 4) may include an image sensor (e.g., the image sensor 230 in FIG. 2 or the imaging surface img of FIG. 5), and a first lens, a second lens, a third lens, a fourth lens, a fifth lens, a sixth lens, a seventh lens, an eighth lens, and a ninth lens (e.g., the lenses L1, L2, L3, L4, L5, L6, L7, L8, and L9 in FIG. 5) sequentially arranged along an optical axis from an object (e.g., the object obj in FIG. 5) side to an image sensor side. The first lens may include a convex object side surface while having positive refractive power, the second lens may include a concave image sensor side surface while having negative refractive power, the third lens may have positive refractive power, and the eighth lens may have negative refractive power and may include an object side surface and an image sensor side surface, at least one of which is an aspherical surface including at least one inflection point. The lens assembly and/or the electronic device including the same may satisfy Conditional Expression 1 and Conditional Expression 2 below.

$$20 \leq v3 \leq 40 \qquad \text{[Conditional Expression 1]}$$

$$1.7 \leq Fno \leq 2.0 \qquad \text{[Conditional Expression 2]}$$

Here, "v3" may be an Abbe number of the third lens, and "Fno" may be an F-number of the lens assembly.

According to an embodiment, the lens assembly and/or the electronic device including the same may satisfy Conditional Expression 3 below.

$$1.6 \leq N2 \leq 2.0 \qquad \text{[Conditional Expression 3]}$$

Here, "N2" may be the refractive index of the second lens.

According to an embodiment, the lens assembly and/or the electronic device including the same may satisfy Conditional Expression 4 below.

$$0.7 \leq \frac{FL1}{FL} \leq 1.1 \qquad \text{[Conditional Expression 4]}$$

Here, "FL1" may be a focal length of the first lens, and "FL" may be a focal length of the entire lens assembly.

According to an embodiment, the lens assembly and/or the electronic device including the same may satisfy Conditional Expression 5 below.

$$0.8 \leq \frac{TTL}{FL} \leq 1.2 \qquad \text{[Conditional Expression 5]}$$

Here, "TTL" may be a distance measured on the optical axis of the lens assembly from the object side surface of the first lens to an image sensor side surface of the ninth lens, and "FL" may be the focal length of the entire lens assembly.

According to an embodiment, the lens assembly and/or the electronic device including the same may satisfy Conditional Expression 6 below:

$$1.6 \leq N2 \leq 2.0 \qquad \text{[Conditional Expression 6]}$$

Here, "N2" may be the refractive index of the second lens.

According to an embodiment, in the lens assembly and/or the electronic device including the same, at least four lenses in the first to ninth lenses may be aspherical lenses.

According to an embodiment disclosed herein, a lens assembly (e.g., the camera module 180, 280, 305, 312, or 313 in FIGS. 1 to 4 or the lens assembly 400 in FIG. 5) and/or an electronic device (e.g., the electronic device 101, 102, 104, or 300 in FIG. 1, 3, or 4) including the same may include an image sensor (e.g., the image sensor 230 in FIG. 2 or the imaging surface img in FIG. 5), and a first lens, a second lens, a third lens, a fourth lens, a fifth lens, a sixth lens, a seventh lens, an eighth lens, and a ninth lens (e.g., the lenses L1, L2, L3, L4, L5, L6, L7, L8, and L9 in FIG. 5) sequentially arranged along the optical axis from the object (e.g., the object obj in FIG. 5) side to the image sensor side. The first lens may include a convex object side surface while having positive refractive power, the second lens may have positive refractive power, the third lens may include a concave image sensor side surface while having negative refractive power, and the eighth lens may have negative refractive power and may include an object side surface and an image sensor side surface, at least one of which is an aspherical surface including at least one inflection point. The lens assembly and/or the electronic device including the same may satisfy Conditional Expressions 7 and Conditional Expressions 8 below.

$$20 \leq v3 \leq 40 \qquad \text{[Conditional Expression 7]}$$

$$1.6 \leq N3 \leq 2.0 \qquad \text{[Conditional Expression 8]}$$

Here, "v3" may be the Abbe number of the third lens, and "N3" may be the refractive index of the third lens.

According to an embodiment, the lens assembly and/or the electronic device including the same may satisfy Conditional Expression 9 below.

$$0.7 \leq \frac{FL1}{FL} \leq 1.1 \qquad \text{[Conditional Expression 9]}$$

Here, "FL1" may be a focal length of the first lens, and "FL" may be a focal length of the entire lens assembly.

According to an embodiment, the lens assembly and/or the electronic device including the same may satisfy Conditional Expression 10 below.

$$0.8 \leq \frac{TTL}{FL} \leq 1.2 \qquad \text{[Conditional Expression 10]}$$

Here, "TTL" may be a distance measured on the optical axis of the lens assembly from the object side surface of the first lens to an image sensor side surface of the ninth lens, and "FL" may be the focal length of the entire lens assembly.

According to an embodiment, in the lens assembly and/or the electronic device including the same, at least four lenses in the first to ninth lenses may be aspherical lenses, and the lens assembly and/or the electronic device including the same may satisfy Conditional Expression 11 as follow:

$$1.7 \leq Fno \leq 2.0 \qquad \text{[Conditional Expression 11]}$$

Here, "Fno" may be an F-number of the lens assembly.

According to an embodiment disclosed herein, an electronic device (e.g., the electronic device 101, 102, 104, or 300 of FIG. 1, 3, or 4) may include at least one camera (e.g., the camera module 180, 280, 305, 312, or 313 in FIGS. 1 to 4) including a lens assembly (e.g., the lens assembly 400, 500, 600, or 700 in FIG. 5, 7, 9, or 11), and a processor (e.g., the processor 120 in FIG. 1) or an image signal processor (e.g., the image signal processor 260 in FIG. 2) configured to acquire image information based on light incident on the at least one camera. The lens assembly may include an image sensor (e.g., the image sensor 230 in FIG. 1 or an imaging surface in FIG. 5), and a first lens, a second lens, a third lens, a fourth lens, a fifth lens, a sixth lens, a seventh lens, an eighth lens, and a ninth lens (e.g., the lenses L1, L2, L3, L4, L5, L6, L7, L8, and L9 in FIG. 5) sequentially arranged along an optical axis from an object (e.g., the object obj in FIG. 5) side to the image sensor side. The first lens may have a positive refractive power and may have a convex object side surface, the second lens may include a concave image sensor side surface while having a negative refractive power, the third lens may have a positive refractive power, and the eighth lens may have negative refractive power and may include an object side surface and an image sensor side surface, at least one of which is an aspherical surface including one inflection point, and the electronic device may satisfy Conditional Expression 12 and Conditional Expression 13 below.

$20 \leq v3 \leq 40$ [Conditional Expression 12]

$1.7 \leq Fno \leq 2.0$ [Conditional Expression 13]

Here, "v3" may be the Abbe number of the third lens, and "Fno" may be the F-number of the lens assembly.

According to an embodiment, the electronic device may satisfy Conditional Expression 14 as follows.

$1.6 \leq N2 \leq 2.0$ [Conditional Expression 14]

Here, "N2" may be the refractive index of the second lens.

According to an embodiment, the electronic device may satisfy Conditional Expression 15 below.

$$0.8 \leq \frac{TTL}{FL} \leq 1.2$$ [Conditional Expression 15]

Here, "TTL" may be a distance measured on the optical axis of the lens assembly from the object side surface of the first lens to an image sensor side surface of the ninth lens, and "FL" may be the focal length of the entire lens assembly.

Although the disclosure has been described with reference to certain embodiments as examples, it should be understood that the certain embodiments are intended to be exemplary and are not limiting the disclosure. It will be apparent to those skilled in the art that various changes can be made in form and detail without departing from the overall scope of the disclosure, including the appended claims and equivalents to the same.

What is claimed is:

1. A lens assembly comprising:
   an image sensor; and
   a first lens, a second lens, a third lens, a fourth lens, a fifth lens, a sixth lens, a seventh lens, an eighth lens, and a ninth lens sequentially arranged along an optical axis from an object side toward the image sensor,
   wherein the first lens includes a convex object side surface while having positive refractive power,
   wherein the second lens includes a concave image sensor side surface while having negative refractive power and,
   wherein the third lens has positive refractive power,
   wherein the eighth lens has negative refractive power and includes an object side surface and an image sensor side surface, at least one of which is an aspherical surface including at least one inflection point,
   wherein the lens assembly satisfies Conditional Expression 1 and Conditional Expression 2:

$20 \leq v3 \leq 40$ [Conditional Expression 1]

$1.7 \leq Fno \leq 2.0$, and [Conditional Expression 2]

wherein "v3" is an Abbe number of the third lens, and "Fno" is an F-number of the lens assembly, and wherein the lens assembly satisfies Conditional Expression 6:

$$0.7 \leq \frac{FL1}{FL} \leq 1.1,$$ [Conditional Expression 6]

and
   wherein "FL1" is a focal length of the first lens, and "FL" is a focal length of the entire lens assembly.

2. The lens assembly of claim 1, wherein the lens assembly satisfies Conditional Expression 3:

$1.6 \leq N2 \leq 2.0$, and [Conditional Expression 3]

wherein "N2" is a refractive index of the second lens.

3. The lens assembly of claim 2, wherein the lens assembly satisfies Conditional Expression 4:

$$0.7 \leq \frac{FL1}{FL} \leq 1.1,$$ [Conditional Expression 4]

and
   wherein "FL1" is a focal length of the first lens, and "FL" is a focal length of the entire lens assembly.

4. The lens assembly of claim 3, wherein the lens assembly satisfies Conditional Expression 5:

$$0.8 \leq \frac{TTL}{FL} \leq 1.2,$$ [Conditional Expression 5]

and
   wherein "TTL" is a distance measured on the optical axis of the lens assembly from the object side surface of the first lens to an image sensor side surface of the ninth lens.

5. The lens assembly of claim 1, wherein the lens assembly satisfies Conditional Expression 7:

$$0.8 \leq \frac{TTL}{FL} \leq 1.2,$$ [Conditional Expression 7]

and
   wherein "TTL" is a distance measured on the optical axis of the lens assembly from the object side surface of the first lens to an image sensor side surface of the ninth lens.

6. The lens assembly of claim 1, wherein the lens assembly satisfies Conditional Expression 8:

$$0.8 \leq \frac{TTL}{FL} \leq 1.2,$$ [Conditional Expression 8]

and
   wherein "TTL" is a distance measured on the optical axis of the lens assembly from the object side surface of the first lens to an image sensor side surface of the ninth lens, and "FL" is a focal length of the entire lens assembly.

7. The lens assembly of claim 6, wherein the lens assembly satisfies Conditional Expression 9:

$1.6 \leq N2 \leq 2.0$, and [Conditional Expression 9]

wherein "N2" is a refractive index of the second lens.

8. The lens assembly of claim 1, wherein at least four lenses in the first to ninth lenses are aspherical lenses.

9. An electronic device comprising:
at least one camera including a lens assembly; and
a processor or an image signal processor configured to acquire image information based on light incident on the at least one camera,
wherein the lens assembly includes an image sensor, and a first lens, a second lens, a third lens, a fourth lens, a fifth lens, a sixth lens, a seventh lens, an eighth lens, and a ninth lens sequentially arranged along an optical axis from an object side to an image sensor side,
wherein the first lens has positive refractive power, includes an object side surface, and is convex, the second lens includes an image sensor side surface, has negative refractive power, and is concave, the third lens has positive refractive power, and the eighth lens has negative refractive power and includes an object side surface and an image sensor side surface, at least one of which is an aspherical surface including at least one inflection point,
wherein the electronic device satisfies Conditional Expression 19 and Conditional Expression 20:

$$20 \leq v3 \leq 40 \qquad \text{[Conditional Expression 19]}$$

$$1.7 \leq Fno \leq 2.0, \text{ and} \qquad \text{[Conditional Expression 20]}$$

wherein "v3" is an Abbe number of the third lens, and "Fno" is an F-number of the lens assembly, and wherein the lens assembly satisfies Conditional Expression 6:

$$0.7 \leq \frac{FL1}{FL} \leq 1.1, \qquad \text{[Conditional Expression 6]}$$

and
wherein "FL1" is a focal length of the first lens, and "FL" is a focal length of the entire lens assembly.

10. The electronic device of claim 9, wherein the electronic device satisfies Conditional Expression 21:

$$1.6 \leq N2 \leq 2.0, \text{ and} \qquad \text{[Conditional Expression 21]}$$

wherein "N2" is a refractive index of the second lens.

11. The electronic device of claim 9, wherein the electronic device satisfies Conditional Expression 22:

$$0.8 \leq \frac{TTL}{FL} \leq 1.2, \qquad \text{[Conditional Expression 22]}$$

and
wherein "TTL" is a distance measured on the optical axis of the lens assembly from the object side surface of the first lens to an image sensor side surface of the ninth lens, and "FL" is a focal length of the entire lens assembly.

* * * * *